(12) United States Patent
Nozawa et al.

(10) Patent No.: US 8,632,136 B2
(45) Date of Patent: Jan. 21, 2014

(54) BRAKE CONTROL SYSTEM

(75) Inventors: Yusuke Nozawa, Minami-Alps (JP);
Tohma Yamaguchi, Kawasaki (JP);
Kentaro Ueno, Minami-Alps (JP);
Yukihiko Yamada, Minami-Alps (JP);
Daisuke Kojima, Minami-Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 352 days.

(21) Appl. No.: 13/052,394

(22) Filed: Mar. 21, 2011

(65) Prior Publication Data

US 2011/0241418 A1  Oct. 6, 2011

(30) Foreign Application Priority Data

Mar. 31, 2010  (JP) .................................. 2010-84207

(51) Int. Cl.
*B60T 13/74*  (2006.01)
(52) U.S. Cl.
USPC ................. 303/3; 303/20; 303/115.2; 701/70
(58) Field of Classification Search
USPC ........ 303/3, 20, 115.1, 115.2; 701/70, 71, 78, 701/83; 60/555, 586, 588, 589, 593
See application file for complete search history.

(56) References Cited

U.S. PATENT DOCUMENTS

| 8,348,352 | B2 * | 1/2013 | Nishino et al. | 303/122.05 |
| 8,380,412 | B2 * | 2/2013 | Vollert et al. | 701/70 |
| 2007/0199436 | A1 * | 8/2007 | Ikeda et al. | 91/376 R |
| 2008/0231109 | A1 * | 9/2008 | Yamada et al. | 303/20 |
| 2009/0115242 | A1 | 5/2009 | Ohtani et al. | |
| 2009/0261649 | A1 * | 10/2009 | Higuma et al. | 303/113.3 |
| 2011/0066345 | A1 * | 3/2011 | Nasu et al. | 701/70 |

FOREIGN PATENT DOCUMENTS

JP  2007-112426  5/2007

* cited by examiner

*Primary Examiner* — Pamela Rodriguez
(74) *Attorney, Agent, or Firm* — Wenderoth, Lind & Ponack, LLP

(57) ABSTRACT

A brake control system displaces a primary piston by controlling an operation of the electric motor by a master pressure control unit according to the operation amount (Xop) of the brake pedal, thereby generating a hydraulic pressure in the master cylinder to supply it to wheel cylinders (Ba to Bd). The master pressure control unit sets a target relative displacement ($\Delta XT$) between an input piston and the primary piston and a target hydraulic pressure (PT) in the master cylinder, and appropriately switch which is used to control a brake force. During regenerative cooperation, the master pressure control unit selects the control with use of the target hydraulic pressure, which enables easy execution of a hydraulic pressure control including a subtraction of the hydraulic pressure corresponding to a brake effect from the regenerative cooperation.

20 Claims, 14 Drawing Sheets

BRAKE CONTROL SYSTEM

BACKGROUND OF THE INVENTION

The present invention relates to a brake control system for controlling an operation of a brake apparatus of a vehicle.

A brake apparatus of a vehicle can provide various controls by using, for example, a negative-pressure actuator, an electronic actuator, and a wheel pressure control mechanism. Examples of such controls include a boost control and a brake assist control for assisting a force that a driver exerts to operate a brake, an anti-lock control for preventing a wheel from being locked during a brake operation by adjusting a brake force for each wheel according to a road condition, a vehicle-running state or another factor, and a vehicle stability control for improving steering stability by preventing understeer and oversteer.

Japanese Patent Application Public Disclosure No. 2007-112426 discloses an electric booster detecting driver's operation amount of a brake pedal and controlling an operation of an electric actuator driving a primary piston based on a relative displacement between an input member coupled with the brake pedal and the primary piston of a master cylinder. This electric booster enables execution of various brake controls such as the boost control and the brake assist control.

There is known a regenerative cooperation brake control as one of those brake controls. In a so-called hybrid vehicle or electric vehicle equipped with an electric motor as a power unit, the regenerative cooperation control collects kinetic energy as electric power by driving a power generator (electric motor) through a rotation of a wheel, for example, when the vehicle is slowed down or braked. The regenerative cooperative brake control is a brake control for adjusting a brake force to be generated by a brake apparatus by subtracting a brake effect from the operation of the generator (electric motor) from a brake amount corresponding to driver's brake operation, resulting in generation of a brake force as desired in total.

During execution of such a regenerative cooperation brake control, the control method based on a relative displacement between an input member and a primary piston as disclosed in Japanese Patent Application Public Disclosure No. 2007-112426 has to perform the control by converting a brake effect from an operation of the generator into a relative displacement between the input member and the primary piston, leading to complicated calculations and a cumbersome control. As a result, it becomes difficult to provide a brake force according to driver's brake operation amount, and unable to offer excellent brake operation feeling. Further, in other controls, it may become difficult to appropriately perform the control based on a conversion into a relative displacement between the input member and the primary piston.

Therefore, an object of the present invention is to provide a brake control system capable of appropriately performing various controls.

SUMMARY OF THE INVENTION

According to one aspect of the present invention, a brake control system includes an input member configured to move forward or backward according an operation of a brake pedal, a piston disposed so as to be movable relative to the input member, an actuator configured to cause a forward or backward movement of the piston, and a control unit configured to drive actuator to operate according to a movement of the input member by the brake pedal to generate a thrust force to the piston to generate a brake fluid pressure in a master cylinder. The control unit includes a relative displacement controller configured to set a target relative displacement with respect to a relative displacement between the input member and the piston based on an operation amount of the brake pedal, and control an operation of the actuator so that the relative displacement between the input member and the piston reaches the target relative displacement, a fluid pressure controller configured to set a target fluid pressure with respect to a brake fluid pressure in the master cylinder based on the operation amount of the brake pedal, and control the operation of the actuator so that the brake fluid pressure in the master cylinder reaches the target fluid pressure, and a control switch unit configured to switch which is used to control the operation of the actuator, the relative displacement controller or the fluid pressure controller.

According to the brake control system of the present invention, it is possible to appropriately perform various brake controls.

DETAILED DESCRIPTION OF THE INVENTION

Figure 1:
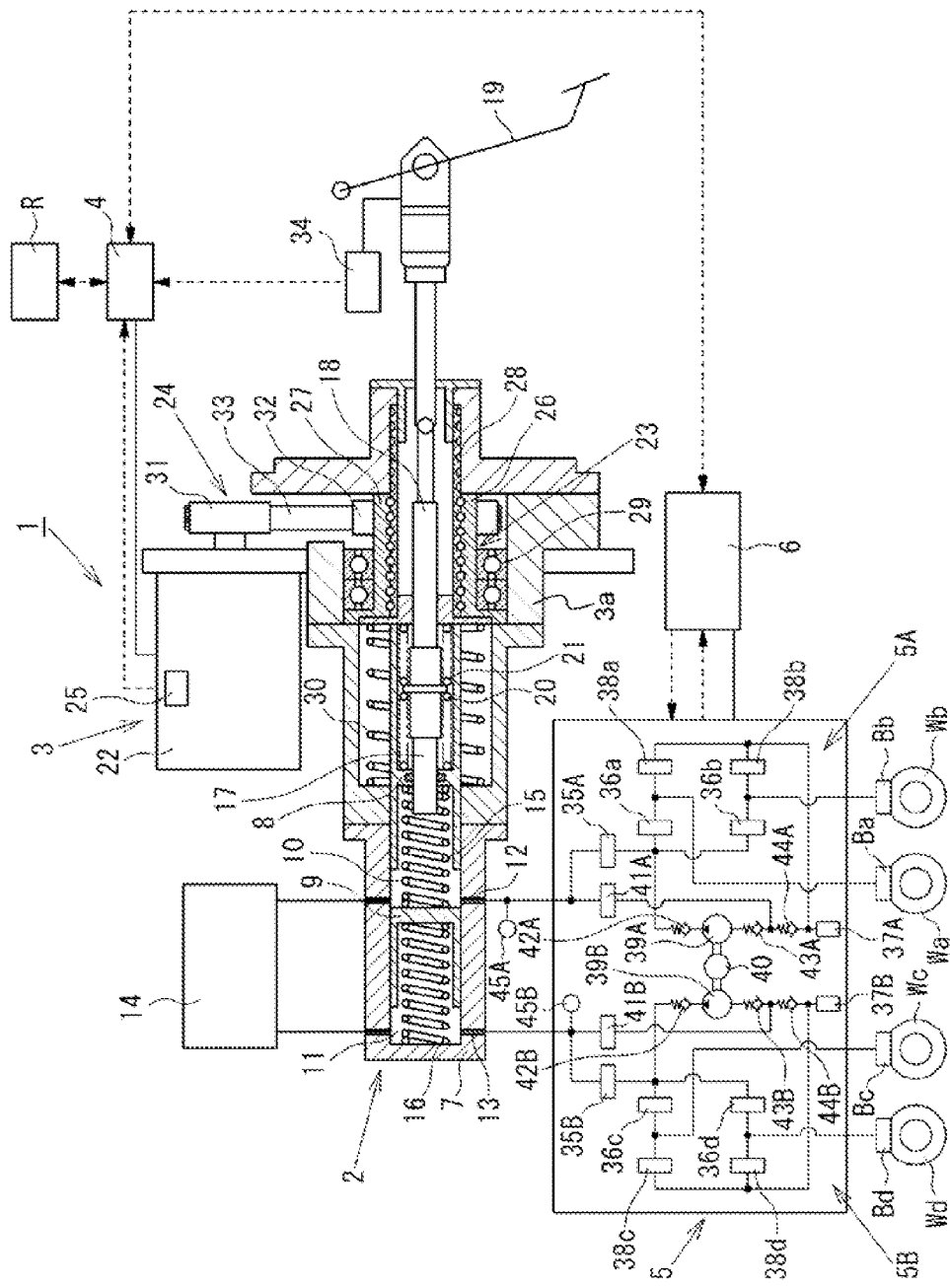
FIG. 1 illustrates an overall configuration of a brake control system according to an embodiment of the present invention.

Hereinafter, an embodiment of the present invention will be described in details with reference to the accompanying drawings. FIG. 1 shows an overall configuration of a brake control system according to the present embodiment. As shown in FIG. 1, a brake control system 1 according to the present embodiment is applied to a brake apparatus of a motor vehicle, and functions to control brake forces applied to four wheels, a front left wheel Wa, a rear right wheel Wb, a front right wheel Wc, and a rear left wheel Wd. The brake control system 1 includes a master cylinder 2, a master pressure control mechanism 3 integrally installed to the master cylinder 2, a master pressure control unit 4 configured to control an operation of the master pressure control mechanism 3, a wheel pressure control mechanism 5 configured to control hydraulic pressures supplied to wheel cylinders of hydraulic brakes Ba, Bb, Bc, and Bd attached to the wheels Wa, Wb, Wc, and Wd, and a wheel pressure control unit 6 configured to control an operation of the wheel pressure control mechanism 5.

The master cylinder 2 is a tandem-type master cylinder. In particular, the master cylinder 2 includes a cylinder 7 filled with brake fluid, a primary piston 8 (piston) inserted in the cylinder 7 so as to be positioned at the opening side of the cylinder 7, a secondary piston 9 inserted in the cylinder 7 so as to be positioned at the bottom side of the cylinder 7. A primary chamber 10 is defined between the primary piston 8 and the secondary piston 9 in the cylinder 7, and a secondary chamber 11 is defined between the secondary piston 9 and the bottom of the cylinder 7. In the master cylinder 2, a forward movement of the primary piston 8 causes the brake fluid in the primary chamber 10 to be pressurized, which causes a forward movement of the secondary piston 9, which then causes the brake fluid in the secondary chamber 11 to be pressurized. The pressurized brake fluid is each supplied from a primary port 12 and a secondary port 13 to the wheel cylinders of the hydraulic brakes Ba, Bb, Bc, and Bd through the wheel pressure control mechanism 5. A reservoir 14 is connected to the primary chamber 10 and the secondary chamber 11. When the primary piston 8 and the secondary piston 9 are located at their respective home positions, the reservoir 14 is in communication with the primary chamber 10 and the secondary chamber 11, thereby appropriately supplying the brake fluid to the master cylinder 2. The primary piston 8 and the secondary piston 9 are biased by return springs 15 and 16 to their respective home positions.

In this way, the master cylinder 2 supplies the brake fluid to the hydraulic circuits of two systems through the primary port 12 and the secondary port 13 by two pistons, the primary piston 8 and the secondary piston 9. Therefore, even if a failure arises in one of the hydraulic circuits, the supply of the hydraulic pressure can be maintained by the other hydraulic circuit, thereby enabling infallible generation of a brake force.

An input piston 17, which is an input member, is slidably and liquid-tightly inserted through the center of the primary piston 8. The front end of the input piston 17 is inserted in the primary chamber 10. An input rod 18 is coupled to the rear end of the input piston 17. The input rod 18 extends through the master pressure control mechanism 3 to the outside. A brake pedal 19 is coupled to the end of the input rod 18. A pair of neutral springs 20 and 21 is disposed between the primary piston 8 and the input piston 17. The primary piston 8 and the input piston 17 are elastically maintained at the neutral positions with the aid of the spring forces of the neutral springs 20 and 21, and are configured to be subject to the spring forces of the neutral springs 20 and 21 against an axial relative displacement therebetween.

The master pressure control mechanism 3 includes an electric motor 22 serving as an actuator for driving the primary piston 8, a ball-screw mechanism 23 which is a rotation-linear motion conversion mechanism disposed between the primary piston 8 and the electric motor 22, and a belt speed reduction mechanism 24 serving as a speed reduction mechanism. The electric motor 22 includes a position sensor 25 for detecting a rotational position of the electric motor 22, whereby a desired rotational position can be obtained by operating the electric motor 22 according to an instruction issued from the master pressure control unit 4. The electric motor 22 can be embodied by, for example, a known DC motor, DC brushless motor, or AC motor, although the present embodiment employs a DC brushless motor in consideration of, for example, controllability, low-noise operation, and durability.

The ball screw mechanism 23 includes a hollow linear motion member 26 with the input rod 18 inserted therethrough, a cylindrical rotational member 27 with the linear motion member 26 inserted therethrough, and balls 28 (steel balls) which are a plurality of rolling members disposed in screw grooves defined between the linear motion member 26 and the rotational member 27. The front end of the linear motion member 26 abuts against the rear end of the primary piston 8. The rotational member 27 is rotatably supported by the housing 3a through a bearing 29. The rotational member 27 is rotated by the electric motor 22 through the belt speed reduction mechanism 24, thereby causing rolling movements of the balls 28 in the screen grooves in the ball screw mechanism 23, resulting in a displacement of the primary piston 8 through a linear motion of the linear motion member 26. The linear motion member 26 is biased toward a retracted position by a return spring 30.

The rotation-linear motion conversion mechanism may be embodied by another mechanism such as a rack and pinion mechanism capable of converting a rotational motion of the electric motor 22 (i.e., the speed reduction mechanism 24) into a linear motion to transmit it to the primary piston 8. The present embodiment employs the ball screw mechanism 23 as the rotation-linear motion conversion mechanism in consideration of, for example, smallness of a play, efficiency and durability. The ball screw mechanism 23 has back-drivability and can rotate the rotational member 27 through a linear motion of the linear motion member 26. Further, the linear motion member 26 abuts from the rear of the primary piston 8, and the primary piston 8 can separate from the linear motion 20 to move forward alone. Therefore, even when the electric motor 22 cannot function due to, for example, line disconnection, the linear motion member 26 is returned to the retracted position by the spring force of the return spring 30 and the primary piston 8 can move alone at this time, thereby enabling prevention of brake dragging. Further, it is also possible to generate a hydraulic pressure by operating the input piston 17 by the brake pedal 19 and operating the primary piston 8 via the input rod 18.

The belt speed reduction mechanism 24 includes a driving pulley 31 attached to an output shaft of the electric motor 22, a driven pulley 32 attached around the rotational member 27 of the ball screw mechanism 23, and a belt 33 wound between the driving pulley 31 and the driven pulley 32. The belt speed reduction mechanism 24 functions to transmit a rotation of the output shaft of the electric motor 22 to the ball screw mechanism 23 while slowing down it at a predetermined speed reduction ratio. The belt speed reduction mechanism 24 may be combined with another speed reduction mechanism such as a gear speed reduction mechanism. Alternatively, the belt speed reduction mechanism 24 may be replaced with, for example, a known gear speed reduction mechanism, a chain speed reduction mechanism, or a differential speed reduction mechanism. Alternatively, if a sufficiently large torque can be obtained by the electric motor 22, the speed reduction mechanism may be omitted and the rotation-linear motion conversion mechanism may be directly driven by the electric motor 22.

A brake operation amount detector 34 is coupled to the input rod 18. The brake operation amount detector 34 can detect at least a position or a displacement amount (stroke) of the input rod 18 (stroke detector), and may include a plurality of position sensors including a displacement sensor of the input rod 18, and a force sensor detecting a pressing force that a driver applies to a brake pedal 19.

The wheel pressure control mechanism 5 includes hydraulic circuits of two systems constituted by a first hydraulic circuit 5A for supplying a hydraulic pressure from the primary port 12 of the master cylinder 2 to the brake apparatuses Ba and Bb of the front left wheel Wa and the rear right wheel Wb, and a second hydraulic circuit 5B for supplying a hydraulic pressure from the secondary port 13 to the brake apparatuses Bc and Bd of the front right wheel Wc and the rear left wheel Wd. In the present embodiment, the brake apparatuses Ba to Bd are each embodied by a hydraulic disk brake generating a brake force by supplying a hydraulic pressure to the wheel cylinder to advance the piston to press a brake pad against a disk rotor rotating together with the wheel, but may be embodied by another type of hydraulic brake such as a known drum brake.

The first hydraulic circuit 5A and the second hydraulic circuit 5B have a similar configuration. Further, the hydraulic circuits connected to the brake apparatuses Ba to Bd of the wheels Wa to Wd have a similar configuration. In the following description, characters A, B and a to d added to reference numerals indicate that a member is associated with the first hydraulic circuit 5A, the second hydraulic circuit 5B, and the wheels Wa to Wd, respectively.

The wheel pressure control mechanism 5 includes supply valves 35A and 35B, pressure increase valves 36a to 36d, the reservoir 37A and 37B, pressure reduction valves 38a to 38d, pumps 39A and 39B, a pump motor 40, pressurization valves 41A and 41B, check valves 42A, 42B, 43A, 43B, 44A, and 44B, and hydraulic sensors 45A and 45B. The supply valves 35A and 35B are electromagnetic open/close valves controlling a supply of a hydraulic pressure from the master cylinder 2 to each of the wheel cylinders of the brake apparatuses Ba to Bd of the wheels Wa to Wd. The pressure increase valves 36a to 36d are electromagnetic open/close valves controlling a supply of a hydraulic pressure to each of the brake apparatuses Ba to Bd The reservoirs 37A and 37B release a hydraulic pressure from each of the brake apparatuses Ba to Bd. The pressure reduction valves 38a to 38d are electromagnetic open/close valves controlling a release of a hydraulic pressure from each of the brake apparatuses Ba to Bd to the reservoirs 37A and 37B. The pumps 39A and 39B supply a hydraulic pressure to each of the brake apparatuses Ba to Bd. The pump motor 40 drives the pumps 39A and 39B. The pressurization valves 41A and 41B are electromagnetic open/close valves controlling a supply of a hydraulic pressure from the master cylinder 2 to each of the suction sides of the pumps 39A and 39B. The check valves 42A, 42B, 43A, 43B, 44A, and 44B prevent a reverse flow from the downstream side to the upstream side of each of the pumps 39A and 39B. The hydraulic sensors 45A and 45B detect a hydraulic pressure at each of the primary port 12 and the secondary port 13 of the master cylinder 2.

The wheel pressure control unit 6 controls operations of the supply valves 35A and 35B, the pressure increase valves 36a to 36d, the pressure reduction valves 38a to 38d, the pressurization valves 41A and 41B, and the pump motor 40. More specifically, the wheel pressure control unit 6 supplies a fluid pressure from the master cylinder 2 to the brake apparatuses Ba to Bd of the wheels Wa to Wd by opening the supply valves 35A and 35B and the pressure increase valves 36a to 36d while closing the pressure reduction valves 38a to 38d and the pressurization valves 41A to 41B. On the other hand, the wheel pressure control unit 6 releases the hydraulic pressures in the brake apparatuses Ba to Bd to the reservoirs 37A and 37B so that the brake apparatuses Ba to Bd are depressurized, by opening the pressure reduction valves 38a to 38d while closing the supply valves 35A and 35B, the pressure increase valves 36a to 36d, and the pressurization valves 41A and 41B. Further, the wheel pressure control unit 6 maintains the hydraulic pressures in the brake apparatuses Ba to Bd by closing the pressure increase valves 36a to 36d and the pressure reduction valves 38a to 38d. The wheel pressure control unit 6 increases the hydraulic pressures in the brake apparatuses Ba to Bd regardless of the hydraulic pressure in the master cylinder 2 by opening the pressure increase valves 36a to 36d, closing the supply valves 35A and 35B, the pressure reduction valves 38a to 38d and the pressurization valves 41A and 41B, and starting the pump motor 40. The wheel pressure control unit 6 further pressurizes the hydraulic pressure from the master cylinder 2 by the pumps 42A and 42B to be supplied to the brake apparatuses Ba to Bd, by opening the pressurization valves 41A and 41B and the pressure increase valves 36a to 36d, closing the pressure reduction valves 38a to 38d and the supply valves 35A and 35B, and starting the pump motor 40.

These operations enable execution of various brake controls. Examples of the various brake controls include the brake force distribution control for appropriately distributing a brake force to wheels according to a vertical load or another factor during a braking operation, the anti-lock brake control for preventing a wheel from being locked by automatically adjusting a brake force of the wheel during a braking operation, the vehicle stability control for stabilizing a behavior of a vehicle by detecting sideslip of wheels of the vehicle being running to appropriately automatically apply a brake force to wheels to prevent understeer and oversteer, the hill start aid control for helping a start by maintaining a braked state when a vehicle is parked on a hill (especially uphill), the traction control for preventing an idle rotation of a wheel, for example, when a vehicle starts to run, the vehicle follower control for maintaining a predetermined distance to a preceding vehicle, the traffic lane deviation prevention control for keeping a vehicle within a traffic lane, and the obstacle avoidance control for avoiding a collision with an obstacle.

The pumps 39A and 39B can be each embodied by a known hydraulic pump such as a plunger pump, a trochoid pump, or a gear pump, although it is desirable to use a gear pump in consideration of, for example, vehicle mountability, low-noise operation, and pump efficiency. The pump motor 40 can be embodied by a known motor such as a DC motor, a DC brushless motor, an AC motor, although it is desirable to use a DC brushless motor in consideration of controllability, low-noise operation, durability and vehicle mountability.

Further, the characteristic of the electromagnetic valves of the wheel pressure control mechanism 5 can be arbitrarily set according to the usage and conditions, although it is desirable to construct such a configuration that the supply valves 35A and 35B and the pressure increase valves 36a to 36d are constantly open, and the pressure reduction valves 38a to 38d and the pressurization valves 41A and 41B are constantly closed in consideration of fail-safe capability and control efficiency. This configuration enables a supply of a hydraulic pressure from the master cylinder 2 to the brake apparatuses Ba to Bd when the wheel pressure control unit 6 does not issue any control signal.

Figure 2:
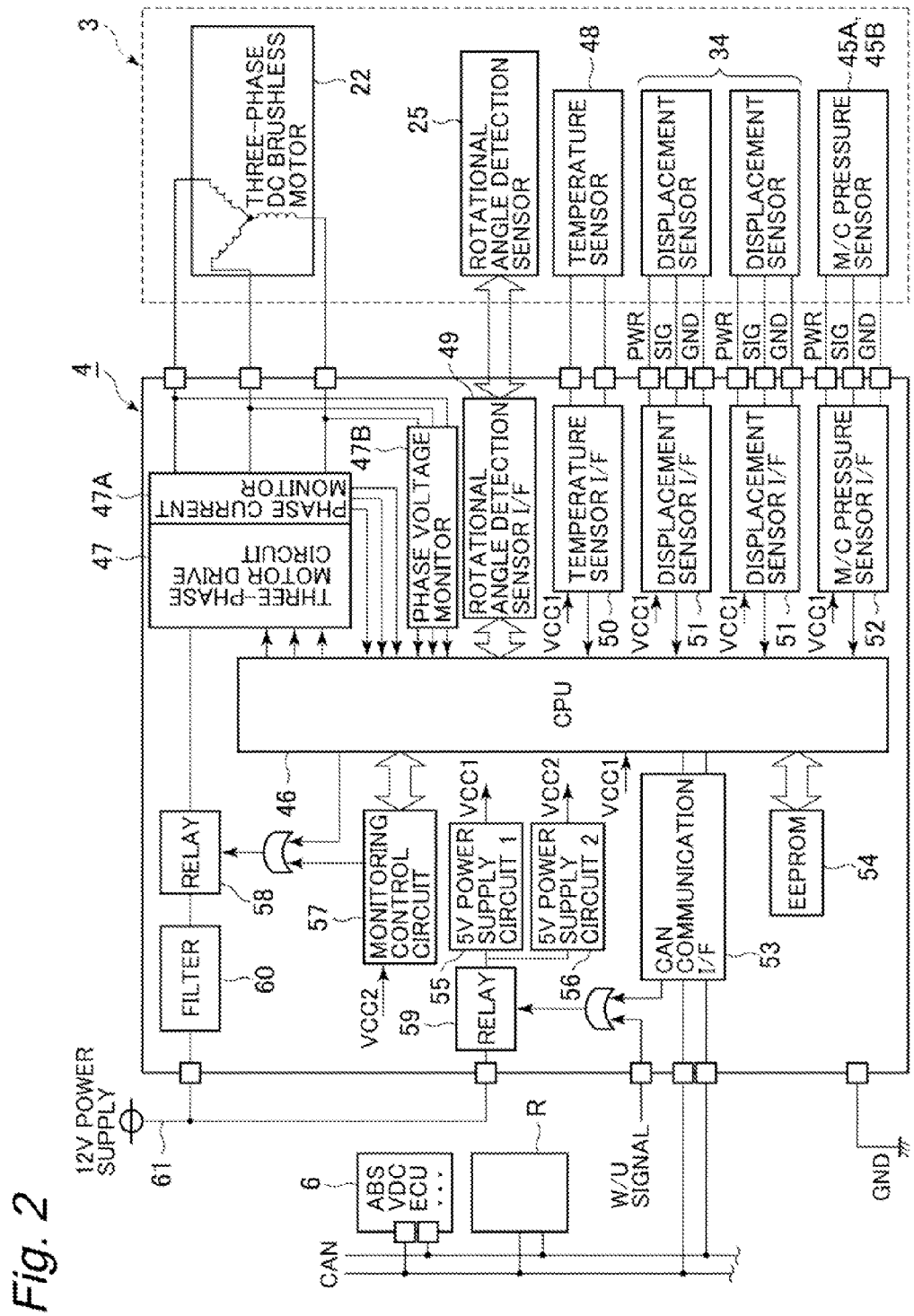
FIG. 2 is a circuit diagram illustrating an overall configuration of a master pressure control unit of the brake control system shown in FIG. 1.

Next, the master pressure control unit 4 will be described. FIG. 2 shows an example of a circuit configuration of the master pressure control unit 4. As shown in FIG. 2, the master pressure control unit 4 includes: a central processing unit (CPU) 46; a three-phase motor drive circuit 47 for outputting drive current to the electric motor 22 (three-phase DC brushless motor) 22; the rotational angle detector sensor 25 of the master pressure control mechanism 3; the pedal operation amount detector 34 including a displacement sensor; a temperature sensor 48 (only shown in FIG. 2); a rotational angle detection sensor interface 49, a temperature sensor interface 50, a displacement sensor interfaces 51 and 51, and a pressure sensor interface 52 for enabling the central processing unit 46 to receive various detection signals from pressure sensors 45A and 45B which detect pressures in the primary chamber 10 and the secondary chamber 11 of the master cylinder 2; a CAN communication interface 53 for enabling the central processing unit (CPU) 46 to receive a CAN signal from devices mounted on the vehicle including the wheel pressure control unit 6; a storage apparatus 54 (EEPROM) storing various kinds of information required for the central processing unit 46 (CPU) to execute processing; first and second power supply circuits 55 and 56 supplying stable power to the central processing unit 46; a monitoring control circuit 57 monitoring any abnormality at the central processing unit 46 and first and second power supply units 55 and 56; a fail safe relay 58; an ECU power supply relay 59; and a filter circuit 60.

The central processing unit 46 controls an operation of the electric motor 22 by outputting an instruction signal to the three-phase motor drive circuit 47 based on application of predetermined logics and rules to, for example: various detection signals from, for example, the rotational angle detection sensor 25, the operation amount detector 34, the temperature sensor 48 and the pressure sensors 45A and 45B; various kinds of information notified by a CAN signal from, for example, various devices mounted on the vehicle including the wheel pressure control unit 6; and information stored in the storage apparatus 54 (EEPROM).

Power is supplied from a power supply line 61 installed on the vehicle to the first and second power supply circuits 55 and 56 through the ECU power supply relay 59. More specifically, the ECU power supply relay 59 supplies power to the first and second power supply circuits 55 and 56 by detecting either that the CAN communication interface 53 receives a CAN signal, or that a predetermined actuation signal W/U is received from, for example, an ignition switch, a brake switch, or a door switch. Further, power is supplied from the power supply line 61 to the three-phase motor drive circuit 47 through the filter circuit 60 and the fail-safe relay 58. At this time, the filter circuit 60 eliminates noises from power to be supplied to the three-phase motor drive circuit 47.

The phases of the three-phase outputs of the three-phase motor drive circuit 47 are monitored by a phase current monitor circuit 47A and a phase voltage monitor circuit 47B. The central processing unit 46 diagnoses a failure of the master pressure control unit 4 based on, for example, values from their monitoring and failure information stored in the storage apparatus 54, and outputs a failure signal to the monitoring control circuit 57 when the central processing unit 46 determines that a failure arises. The monitoring control circuit 57 actuates the fail-safe relay 58 to stop a power supply to the three-phase motor drive circuit 47 when a failure arises, based on a failure signal from the central processing unit 46 and various kinds of operation information such as the voltages of the first and second power supply circuits 55 and 56.

The vehicle with the brake control system 1 mounted thereon is provided with a regenerative braking system R. The regenerative braking system R collects kinetic energy as electric power by driving a power generator (electric motor) through a rotation of the wheel, for example, when the vehicle is slowed down or braked. The regenerative braking system R is connected to the CAN signal line, and is connected to the master pressure control unit 4 through the CAN communication interface 53.

Next, how the master pressure control unit 4 controls the master pressure control mechanism 3 will be described.

The master pressure control unit 4 causes the electric motor 22 to rotate and control the position of the primary piston 8 based on an operation amount (for example, a displacement amount and a pedal pressing force) of the brake pedal 19 that is detected by the operation amount detector 34, thereby generating a hydraulic pressure. At this time, a reactive force against the input piston 17 that is generated by the hydraulic pressure is fed-back to the brake pedal 19 through the input rod 18. Then, a boost ratio, which is the ratio of the operation amount of the brake pedal 19 and the generated hydraulic pressure, can be adjusted according to the ratio of pressure-receiving areas of the primary piston 8 and the input piston 17, and a relative displacement.

For example, the master pressure control unit 4 performs a relative displacement control in such a manner that the primary piston 8 follows a displacement of the input piston 17 to have no relative displacement generated therebetween. In this case, to the master pressure control mechanism 3 can obtain a predetermined boost ratio determined by the ratio of pressure-receiving areas of the input piston 17 and the primary piston 8. Further, the master pressure control unit 4 multiplies a displacement of the input piston 17 by a proportional gain to generate a relative displacement between the input piston 17 and the primary piston 8. In this case, a boost ratio can be changed.

This configuration enables execution of a so-called brake assist control for quickly obtaining a required brake force (hydraulic pressure) by detecting the necessity of emergency braking from, for example, an operation amount of the brake pedal 19 and an operation speed (change rate of the operation amount) to increase the boost ratio. Further, this configuration enables execution of a regenerative cooperative brake control for obtaining a desired brake force as a total of a brake effect generated from regenerative braking and a brake force generated by a hydraulic pressure, by adjusting the boot ratio so as to generate a hydraulic pressure reduced in consideration of the brake effect generated from regenerative braking based on a CAN signal from the regenerative braking system R during regenerative braking. Further, this configuration enables execution of an automatic braking control for generating a brake force by moving the primary piston 8 by actuating the electric motor 22 regardless of an operation amount of the brake pedal 19 (displacement amount of the input piston 17). As a result, vehicle operation controls such as the above-mentioned vehicle follower control, traffic lane deviation prevention control, and obstacle avoidance control can be realized with use of the master pressure control unit 4 by automatically adjusting a brake force based on a vehicle condition detected by the various sensor means and appropriately combining the brake control with other vehicle controls such as an engine control and a steering control.

Figure 3:
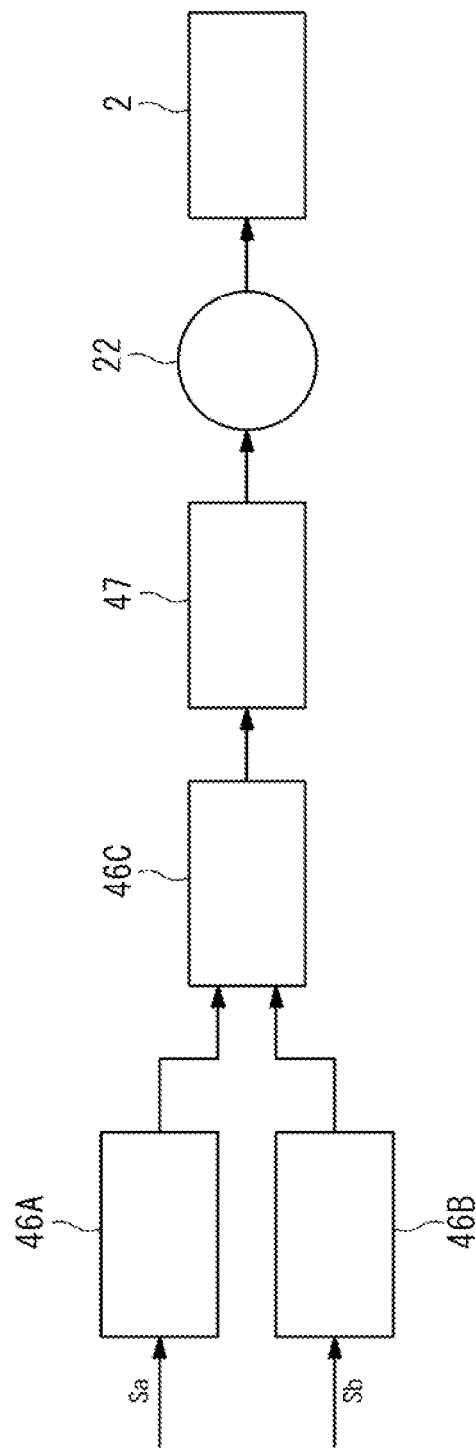
FIG. 3 is a block diagram illustrating a control performed by the master pressure control unit shown in FIG. 2.

Next, switching of the control by the master pressure control unit 4 will be described. FIG. 3 shows a control configuration about how the master pressure control unit 4 controls the master pressure control mechanism 3. As shown in FIG. 3, the master pressure control unit 4 includes a relative displacement controller 46A for determining a target relative displacement ΔXT between the primary piston 8 and the input piston 17 based on a control input Sa, a hydraulic pressure controller 46B for determining a target hydraulic pressure PT to be generated in the master cylinder 2 based on a control input Sb, and a control switch unit 46C for determining which is used to control an operation of the electric motor 2 of the master pressure control mechanism 3, the target relative displacement ΔXT or the target hydraulic pressure PT, and performing the determined control accordingly.

The relative displacement controller 46A can use, as the control input Sa, for example, a displacement amount (stroke) of the input rod 18 (i.e., the brake pedal 19) coupled with the input piston 17 that is detected by the brake operation amount detector 34, an operation force (pressing force) of the brake pedal 19, a generated hydraulic pressure in the master cylinder 2, or an estimated pressing force FC obtained by calculations of these detection values. At this time, hese detection values may be used alone or as a combination thereof. The target relative displacement ΔXT may be preset in a table so as to be associated with the control input Sa, or may be obtained from a predetermined calculation based on the control input Sa.

The hydraulic pressure controller 46B can use the same kinds of information as those for the above-mentioned control input Sa as the control input Sb. The control input Sa and Sb may be the same or different. The target hydraulic pressure PT may be preset in a table so as to be associated with the control input Sb, or may be obtained from a predetermined calculation based on the control input Sb.

The control switch unit 46C selects either the target relative displacement ΔXT or the target hydraulic pressure PT, which are target control amounts obtained from the relative displacement controller 46A and the hydraulic pressure controller 46B, according to a predetermined determination condition. At this time, the control switch unit 46C may process the target relative displacement ΔXT and the target hydraulic pressure PT, such as applying a limitation to the target relative displacement ΔXT and the target hydraulic pressure PT according to the determination condition.

The three-phase motor control circuit 47 outputs a control drive signal based on the target relative displacement ΔXT or the target hydraulic pressure PT selected by the control switch unit 46C, so as to control an operation of the electric motor 22 of the master pressure control mechanism 3 to actually obtain the target relative displacement ΔXT or the target hydraulic pressure PT. At this time, for example, the target relative displacement ΔXT or the target hydraulic pressure PT can be obtained by determining the corresponding target position of the primary piston 8 based on the target relative displacement ΔXT or the target hydraulic pressure PT, and controlling an operation of the electric motor 22 to move the primary piston 8 to the target position.

Figure 4:
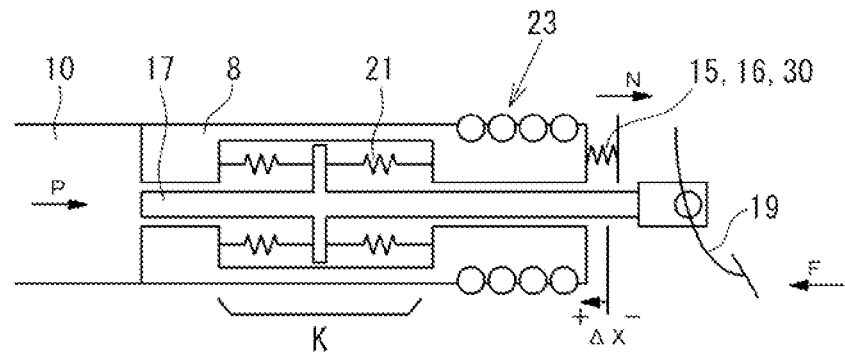
FIG. 4 illustrates a balance among forces in a master cylinder of the brake control system shown in FIG. 1.

The balance among the pressures and forces in the master cylinder 2 and the master pressure control mechanism 3 will be described with reference to FIG. 4. In FIG. 4, the following equation (1) can be established.

$$F = -K\Delta X + Ai \times P + N \qquad (1)$$

In this equation, F represents an operation force (pressing force) applied to the brake pedal 19, K represents a combined spring constant of the neutral springs 20 and 21, ΔX represents a relative displacement between the primary piston 8 and the input piston 17, Ai represents a pressure-receiving area of the input piston 17 to the primary chamber 10, P represents a hydraulic pressure in the master cylinder 2 (primary chamber 10), and N represents a set load by the return springs 15, 16 and 30.

The operation amount F (estimated pressing force FC) applied to the brake pedal 19 can be obtained from the calculation with use of the equation (1) based on the relative displacement ΔX and the hydraulic pressure P. Then, the thus-obtained estimated pressing force FC can be used as the control input Sa or Sb. (In this case, the brake operation amount detector 34 serves as a pressing force estimator.)

Next, an example of a relative displacement control performed by the relative displacement controller 46A will be described. Under this control, the target relative displacement ΔXT when the brake pedal 19 is returned (released) in a return direction of the input rod 18 by an operation amount Xop is increased relative to the target relative displacement amount ΔX when the brake pedal 19 is pressed in an advance direction of the input rod 18 by the same operation amount Xop. According to this control, the target relative displacement ΔXT is increased when a driver starts to return the brake pedal 19, while the target relative displacement ΔX is reduced when the driver presses again the brake pedal 19 that the driver has started to return. Therefore, when the input rod 18 is moved, the primary piston 8 is delayed by an appropriate degree in its start to return and start to advance, whereby the hydraulic pressure in the master cylinder 2 shows a gradual reduction and increase so that the driver can have improved feeling to an operation of the brake pedal 19.

Figure 10:
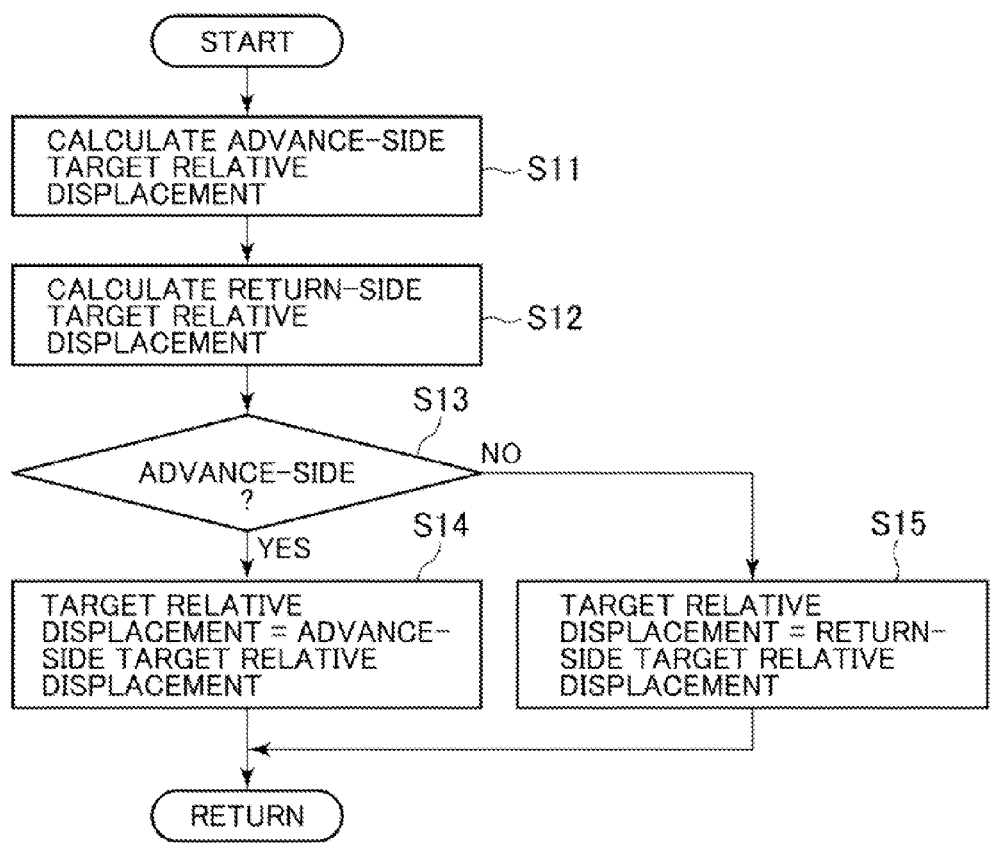
FIG. 10 is a flowchart illustrating a relative displacement control performed when there is a hysteresis in a displacement direction of the brake pedal.

FIG. 10 shows a control flow for performing a relative displacement control having a hysteresis in a displacement direction of the brake pedal 19. Referring to FIG. 10, in step S11, the relative displacement controller 46A calculates the target relative displacement ΔXT in the advance direction of the input rod 18. In step S12, the relative displacement controller 46A calculates the target relative displacement ΔXT in the return direction of the input rod 18. In step S13, the relative displacement controller 46A determines which direction the input rod 18 is displaced in, the advance direction or the return direction. If the relative displacement controller 46A determines in step S3 that the input rod 18 is displaced in the advance direction, the processing proceeds to step S14 in which the advance-side target relative displacement ΔXT is set as the target relative displacement ΔXT. On the other hand, if the relative displacement controller 46A determines in step 13 that the input rod 18 is displaced in the return direction, the processing proceeds to step S15 in which the return-side target relative displacement ΔXT is set as the target relative displacement ΔXT.

Figure 5:
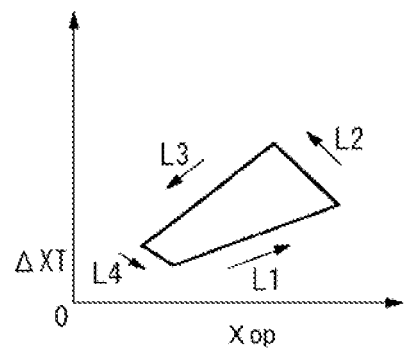
FIG. 5 is a graph illustrating the relationship between a brake pedal operation amount and a target relative displacement at a relative displacement controller.

At this time, as shown in FIG. 5, the target relative displacement ΔXT is increased according to an increase in the operation amount Xop with respect to a displacement of the input rod 18, i.e, the operation amount Xop applied to the brake pedal 19 that is detected by the operation amount detector 34. Further, the return-side target relative displacement ΔXT (L3) in response to the operation amount Xop is increased relative to the advance-side target relative displacement ΔXT (L1) in response to the same operation amount Xop. In this way, a hysteresis in the counterclockwise direction is set to the target relative displacement ΔXT. Then, on the section L2 where the target relative displacement ΔXT is changed from the advance-side target relative displacement ΔXT (L1) to the return-side relative displacement ΔXT (L3), the target relative displacement ΔXT is set so as to prevent the primary piston 8 from being displaced, thereby enabling prevention of an excessive change in the hydraulic pressure in the primary chamber 10 due to a displacement of the primary piston 8 so as to reduce vibration due to a change in the hydraulic pressure that would be transmitted to the brake pedal 19 via the input piston 17 to thereby improve operation feeling when a driver releases his/her pressing force applied to the brake pedal 19. Further, due to a reduction in times of displacement of the primary piston 8, it is possible to reduce times of operations of the electric motor 22, the ball screw mechanism 23, and the speed reduction mechanism 24 to enhance durability of these components while reducing generation of noises and power consumption.

On the section L2 where the target relative displacement amount is changed from the advance-side target relative displacement ΔXT (L1) to the return-side target relative displacement ΔXT (L3), and the section L4 where the target relative displacement amount is changed from the return-side target relative displacement ΔXT (L3) to the advance-side target relative displacement ΔXT (L1), a rapid change in the target relative displacement ΔXT may generate such a state that the increase or reduction direction of the hydraulic pressure in the master cylinder 2 does not match the operation direction of the brake pedal 19. Therefore, in order to prevent occurrence of this state, it is desirable to set the target relative displacement ΔXT on the sections L2 and L4 so as to have a gradual change.

Further, the relative displacement controller 46A may selectively switch between the displacement of the brake pedal 19, i.e., the input rod 18 that is detected by the operation amount detector 34, and the estimated pressing force FC of the brake pedal 19 that is obtained by calculating the above-mentioned equation (1) from the hydraulic pressure in the master cylinder 2 and the relative displacement ΔX between the primary piston 8 and the input piston 17, and may use the selected one as the control input Sa.

Figure 11:
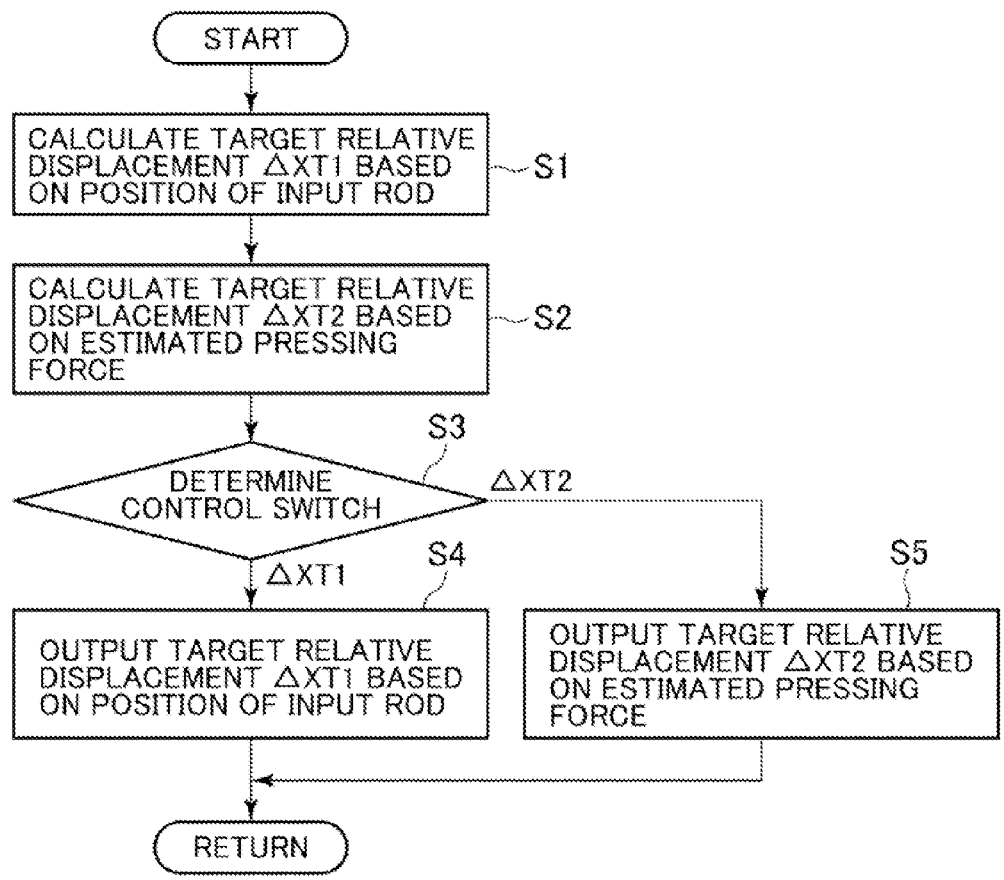
FIG. 11 is a flowchart illustrating a switch control of a control input.

A flow of a switching control of the control input Sa performed by the relative displacement controller 46A will be described with reference to FIG. 11. In step S11, the relative displacement controller 46A determines the target relative displacement ΔXT1 based on the displacement (position) of the input rod 18 detected by the operation amount detector 34. In particular, the target relative displacement ΔXT1 can be obtained from the table containing the predetermined relationship between the position of the input rod 18 and the target relative displacement ΔXT1 as mentioned above, or from a calculation of the position of the input rod 18 according to a predetermined logic/rule. The determination of the target relative displacement ΔXT1 based on the displacement of the input rod 18 in this way enables an accurate control in the vicinity of the home position of the brake pedal 19.

In step S2, the relative displacement controller 46A determines the target relative displacement ΔXT2 based on the above-mentioned estimated pressing force FC. In particular, the target relative displacement ΔXT2 can be obtained from the table containing the predetermined relationship between the estimated pressing force FC and the target relative displacement ΔXT2 as mentioned above, or from a calculation of the estimated pressing force FC according to a predetermined logic/rule. The determination of the target relative displacement ΔXT2 based on the estimated pressing force FC in this way enables improvement in brake operation feeling.

Then, in step S3, the relative displacement controller 46A determines which is used in the control, the target relative displacement ΔXT1 based on the displacement of the input rod 18 or the target relative displacement ΔXT2 based on the estimated pressing force FC. Then, the relative displacement controller 46A sets the target relative displacement ΔXT1 based on the displacement of the input rod 18 in step S4 or sets the target relative displacement ΔXT2 based on the estimated pressing force FC in step S5, as the target relative displacement ΔXT according to the determination result.

At this time, for example, the method for determining the target relative displacement ΔXT can be switched according to the displacement direction of the brake pedal 19. Further, when the hysteresis in the counterclockwise direction is set to the target relative displacement ΔXT as shown in the above-mentioned FIG. 5, the target relative displacement ΔXT1 based on the displacement of the input rod 18 is employed for the section L3 indicating the return direction of the brake pedal 19, while the target relative displacement ΔXT2 based on the estimated pressing force FC is employed for the sections L1, L2 and L4 indicating other directions including the advance direction of the brake pedal 19. As a result, it is possible to ensure a return of the primary piston 8 to the home position when the brake is released while improving brake operation feeling.

In addition, when the relative displacement controller 46A cannot obtain either the displacement of the input rod 18 or the estimated pressing force FC due to, for example, a failure in the operation amount detector 34, the relative displacement controller 46A can continue the control by determining the target relative displacement ΔXT based on remaining information, thereby increasing robustness when a failure arises.

Next, the setting range of the target relative displacement ΔXT in the above-mentioned relative displacement control will be described with reference to FIG. 6.

The setting range of the target relative displacement ΔXT between the primary piston 8 and the input piston 17 is subject to limitations by the structure of the master pressure control mechanism 3 and the control of, for example, feeling in an operation of the brake pedal 19, and therefore it is desirable to set the target relative displacement ΔXT within a range determined based on those limitations. For example, as shown in FIG. 6, the present embodiment sets the target relative displacement ΔXT within a rage surrounded by line segments A1, A2 and B. The line segments A1 and B extending in parallel with the horizontal axis represents the structural limitation, and depends on, for example, the axial dimensions of the primary piston 8 and the input piston 17, and the axial lengths of the neutral springs 20 and 21. On the other and, the inclined line segment A2 represents the limitation from the control of, for example, feeling in an operation of the brake pedal 19, and depends on the characteristics of various members such as the spring constant of the neutral springs 20 and 21 and the pressure-receiving area Ai of the input piston 17.

Then, when the brake is not in operation, since F=0 at this time, the above-mentioned equation (1) is expressed by $$0 = -K\Delta X + Ai \times P + N \quad (2)$$

which is then developed into $$\Delta X = (Ai \times P + N)/K \quad (3).$$

Since the hydraulic pressure P in the master cylinder 2 (primary chamber 10) is equal to 0 at this time, $$\Delta X = N/K \quad (4)$$

can be eventually obtained.

Therefore, setting the target relative displacement ΔXT equal to or smaller than N/K (N: the set load by the return springs 15, 16 and 30, K: the combined spring constant of the neutral springs 20 and 21) ensures a return of the input piston 17, i.e., the brake pedal 19 to the home position when the brake is released.

Further, in the above-mentioned equation (1), a negative pressing force F of the brake pedal 19 means pull-in of the brake pedal 19 which is undesirable in consideration of operation feeling. Therefore, satisfaction of $$0 \leq -K\Delta X + Ai \times P + N \quad (5)$$

is desirable. Then, the following equation (6) can be derived from the equation (5).

$$\Delta X \leq (Ai \times P + N)/K = (Ai/K) \times P + N/K \quad (6)$$

Therefore, it is desirable to set the target relative displacement ΔXT within the range of ΔX indicated by the equation (6), and the line segment A2 constitutes a line having a generally constant slope since the range of ΔX is proportional to the hydraulic pressure P in the master cylinder 2.

Figure 6:
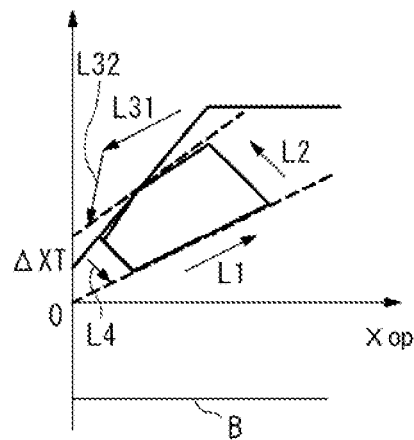
FIG. 6 is a graph illustrating the relationship between the brake pedal operation amount and the target relative displacement with a limitation applied to the target relative displacement.

Therefore, in the setting of the target relative displacement ΔXT having the hysteresis in the counterclockwise direction as shown in FIG. 6, it is possible to solve the problem in the control, pull-in of the brake pedal 19 by replacing the section L3 with a section L31 on the unlimited L2 side and a section L32 limited by the line segment A2 since the line segment A2 places a limitation to the portion near the section L4, of the section L3 indicating the return direction of the brake pedal 19.

Next, a hydraulic pressure control performed by the hydraulic pressure controller 46B will be described Under this control, assuming that the same operation amount Xop is applied to the brake pedal 19, a return-side target hydraulic pressure PT2 when a driver returns the brake pedal 19 (the return direction of the input rod) is increased relative to an advance-side target hydraulic pressure PT1 when a driver presses the brake pedal 19 (the advance direction of the input rod 18). According to this control, the target hydraulic pressure PT is increased when a driver starts to return the brake pedal 19, while the target hydraulic pressure PT is reduced when the driver presses again the brake pedal 19 that the driver has started to return. Therefore, when the input rod 18 is moved, the primary piston 8 is delayed by an appropriate degree in its start to return and start to advance, whereby the hydraulic pressure in the master cylinder 2 shows a gradual reduction and increase so that the driver can have improved feeling to an operation of the brake pedal 19. At this time, smoothly changing the target hydraulic pressure PT at the time of switching the target hydraulic pressure PT between the advance-side and the return-side enables prevention of a sudden change in the hydraulic pressure, thereby preventing an undesirable sudden change in the brake force.

Figure 12:
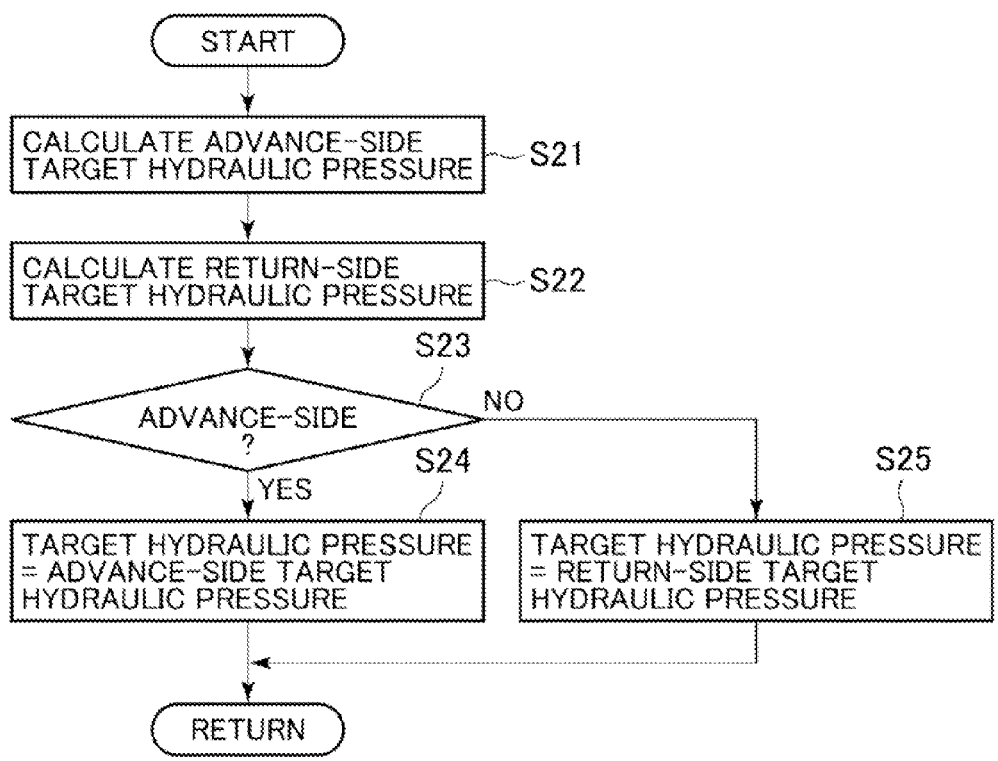
FIG. 12 is a flowchart illustrating a hydraulic pressure control performed when there is a hysteresis in the displacement direction of the brake pedal.

FIG. 12 shows a control flow when the hydraulic pressure controller 46B performs the hydraulic pressure control. Referring to FIG. 12, in step S21, the hydraulic pressure controller 46B calculates the advance-side target hydraulic pressure PT1 of the input rod 18. In step S22, the hydraulic pressure controller 46B calculates the return-side target hydraulic pressure PT2 of the input rod 18. Then, in step S23, the hydraulic pressure controller 46B determines which direction the input rod 18 is displaced in, the advance-side or the return-side. If the hydraulic pressure controller 46B determines that the input rod 18 is displaced in the advance direction, the processing proceeds to step S24 in which the hydraulic pressure controller 46B sets the advance-side target hydraulic pressure PT1 as the target hydraulic pressure PT. On the other hand, if the hydraulic pressure controller 46B determines that the input rod 18 is displaced in the return direction, the processing proceeds to step S25 in which the hydraulic pressure controller 46B sets the return-side target hydraulic pressure PT2 as the target hydraulic pressure PT.

Figure 7:
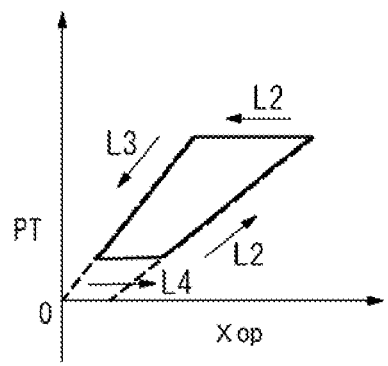
FIG. 7 is a graph illustrating the relationship between the brake pedal operation amount and a target hydraulic pressure at a hydraulic pressure controller.

At this time, as shown in FIG. 7, the target hydraulic pressure PT is increased according to an increase in the operation amount Xop with respect to the displacement of the input rod 18, i.e, the operation amount Xop detected by the operation amount detector 34. Further, the return-side target hydraulic pressure PT2 (section L3) is increased relative to the advance-side target hydraulic pressure PT1 (section L1) with respect to the same operation amount Xop. In this way, the hysteresis in the counterclockwise direction is set to the target hydraulic pressure PT. Then, in the section L2 where the target hydraulic pressure PT is changed from the advance-side target hydraulic pressure PT1 (section L1) to the return-side hydraulic pressure (section L3), and the section L4 where the target hydraulic pressure PT is changed from the return-side target hydraulic pressure PT2 (section L3) to the advance-side hydraulic pressure (section L1), the target hydraulic pressure PT is maintained at a constant value so as to minimize the displacement amount of the primary piston 8, thereby reducing the influence of the reactive force from the primary chamber 10 to the input rod 18 due to the displacement of the primary piston 8. Further, since this leads to a reduction in times of displacement of the primary piston 8, it is possible to reduce times of operations of the electric motor 22, the ball screw mechanism 23, and the speed reduction mechanism 24 to enhance durability of these components while reducing generation of noises and power consumption.

Figure 8:
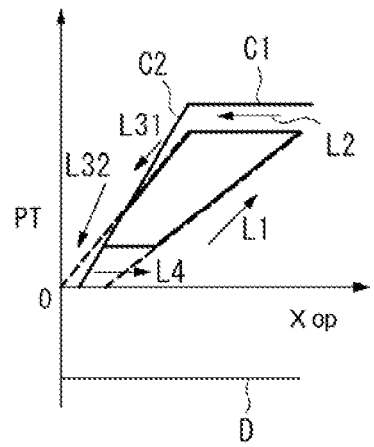
FIG. 8 is a graph illustrating the relationship between the brake pedal operation amount and the target hydraulic pressure with a limitation applied to the target hydraulic pressure.

Next, the setting range of the target hydraulic pressure PT set by the hydraulic pressure controller 46B will be described with reference to FIGS. 8 and 9. When the setting range of the relative displacement ΔXT by the relative displacement setting means is limited within the range show in FIG. 6 as mentioned above, the following relationships can be established from the above-mentioned equation (1), for a certain pressing force F.

$$K\Delta Xn + Ai \times Pn = -K\Delta X\max + Ai \times P\max \quad (7)$$

$$K\Delta Xn + Ai \times Pn = -K\Delta X\min + Ai \times P\min \quad (8)$$

In these equations, K represents the combined spring constant of the neutral springs 20 and 21, Ai represents the pressure-receiving area of the input piston 17 to the primary chamber 10, ΔXn represents a current relative displacement, ΔXmax represents a maximum value of relative displacement, ΔXmin represents a minimum value of relative displacement, Pn represents a current hydraulic pressure in the master cylinder, Pmax represents a maximum value of hydraulic pressure in the master cylinder, and Pmin represents a minimum value of hydraulic pressure in the master cylinder.

The possible maximum hydraulic pressure Pmax can be obtained from the current relative displacement ΔXn, the maximum value of relative displacement ΔXmax, and the current hydraulic pressure in the master cylinder Pn, with use of the equation (7). Further, the possible minimum hydraulic pressure Pmin can be obtained from the current relative displacement ΔXn, the minimum value of relative displacement ΔXmin, and the current hydraulic pressure in the master cylinder Pn, with use of the equation (8). Based on this information, in the present embodiment, the target hydraulic pressure PT is set within the range surrounded by line segments C1, C2 and D, as shown in FIG. 8. The line segment C1 extending in parallel with the horizontal axis and the line segment C2 inclined with a generally constant slope correspond to the line segments A1 and A2 which indicate the range of the relative displacement ΔX, and the line segment D extending in parallel with the horizontal axis corresponds to the line segment B which indicates the range of the relative displacement ΔX. Therefore, in the setting of the target hydraulic pressure PT having the hysteresis in the counter-clockwise direction as shown in FIG. 7, it is possible to perform an appropriate hydraulic pressure control by replacing the section L3 with a section L31 on the unlimited L2 side and a section L32 limited by the line segment C2 and extending along the line segment C2 since the line segment C2 places a limitation to the portion near the section L4, of the section L3 indicating the return direction of the brake pedal 19, and setting the target hydraulic pressure PT within the above-mentioned range.

Figure 9:
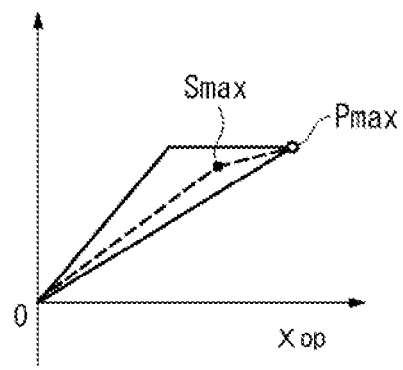
FIG. 9 is a graph illustrating the relationship between the brake pedal operation amount and a brake hydraulic pressure in the master cylinder.

FIG. 9 shows the relationship between the operation amount Xop of the brake pedal 19 and the hydraulic pressure in the master cylinder 2. If the maximum output of the electric motor 22 is preset, this determines the maximum displacement of the primary piston 8, and therefore the operation amount Xop of the brake pedal 19 and the hydraulic pressure in the master cylinder 2 have the relationship as indicated by the broken line in FIG. 9. More specifically, once the primary piston 8 reaches a maximum stroke point Smax that is realized by the electric motor 22, an increase in the operation amount Xop of the brake pedal 19 causes an advance of only the input piston 17, thereby providing a gradually sloped increase in the hydraulic pressure until the hydraulic pressure reaches a maximum hydraulic pressure point Pmax. At this time, a large increase also occurs in the feeling in an operation of the brake pedal 19. When an output of the electric motor 22 is reduced due to, for example, a temperature increase, the maximum stroke point Smax is also reduced accordingly, and reaching to this maximum stroke point Smax causes a change in the feeling in an operation of the brake pedal 19.

Therefore, the hydraulic pressure controller 46B sets the target hydraulic pressure PT so as to reach the maximum hydraulic pressure point Pmax keeping a predetermined slope, so that the hydraulic pressure in the master cylinder 2 has a constant change since the brake pedal 19 is located at its home position until the brake pedal 19 reaches the maximum stroke position (the maximum hydraulic pressure point Pmax). This control enables improvement of feeling in an operation of the brake pedal 19. In the present embodiment, the maximum output of the electric motor 22 is determined by the suppliable maximum current, and the target hydraulic pressure PT is set so as to keep a constant slope by determining the target hydraulic pressure PT by using the maximum current as a parameter. Alternatively, the target hydraulic pressure PT may be obtained from a table presetting the target hydraulic pressure PT corresponding to the operation amount Xop (control input) of the brake pedal 19, or may be obtained by calculating the control input according to a predetermined logic/rule. Further, the target relative displacement ΔXT may be set by the relative displacement controller 46A so that such a hydraulic characteristic in the master cylinder 2 can be obtained.

Next, a description will be given of how the control switch unit 46C switches a control based on the target relative displacement ΔXT or the target hydraulic pressure PT, with reference to FIGS. 13 to 18. The control switch unit 46C switches a control based on the target relative displacement ΔXT or the target hydraulic pressure PT in any of the following manners.

[Switch Based on Whether Regenerative Braking System is in Operation]

Figure 13:
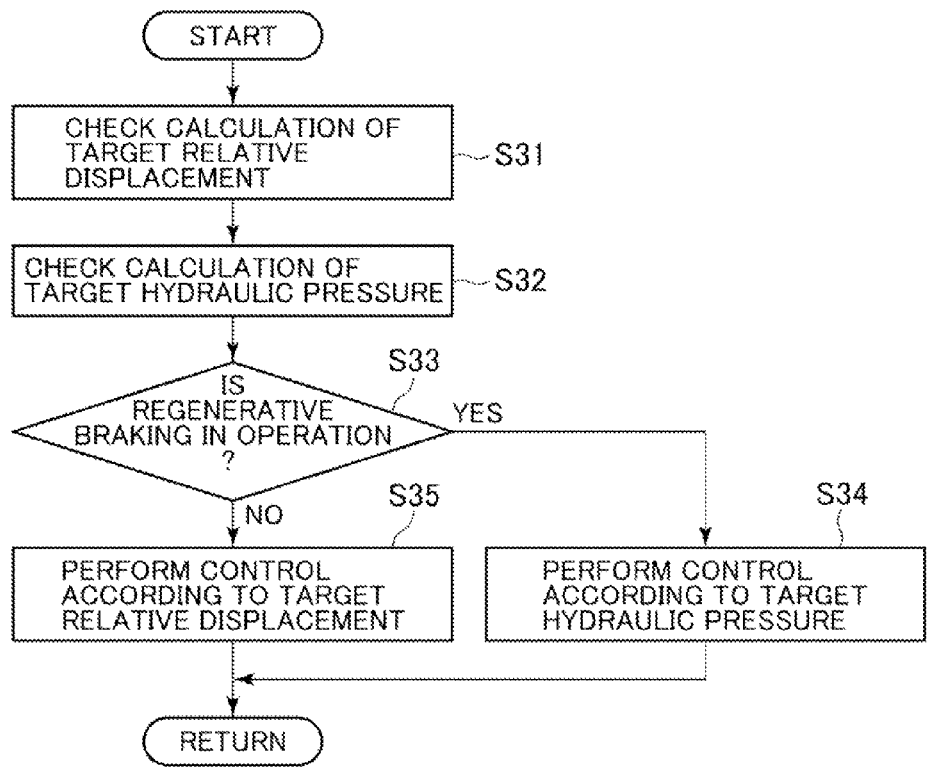
FIG. 13 is a flowchart illustrating a switch control based on whether a regenerative braking system is in operation.

The control switch unit 46C performs the control with use of the target hydraulic pressure PT established by the hydraulic pressure controller 46B when the regenerative braking system R is in operation for regenerative braking (during regenerative cooperation), and performs the control with use of the target relative displacement ΔXT established by the relative displacement controller 46A when the regenerative braking is not in operation. FIG. 13 shows a flow of a switch control performed by the control switch unit 46C. Referring to FIG. 13, in step S31, the control switch unit 46C checks the target relative displacement ΔXT determined by the relative displacement controller 46A determined based on the operation amount Xop of the brake pedal 19. In step S32, the relative displacement controller 46A determines checks the target hydraulic pressure PT determined by the hydraulic pressure controller 46B. In step S33, the control switch unit 46C determines whether the regenerative braking system R is in operation for regenerative braking. If the regenerative braking is in operation, the processing proceeds to step S34 in which the control switch unit 46C performs the control according to the target hydraulic pressure PT. If the regenerative braking is not in operation, the processing proceeds to step S35 in which the control switch unit 46C performs the control according to the target relative displacement ΔXT. At this time, the master pressure control unit 4 inputs an operation signal from the regenerative braking system R through the CAN communication interface 53, and the switch control unit 46C determines whether the regenerative braking is in operation based on the input operation signal.

When the regenerative cooperation is in operation, the hydraulic pressure that should be generated in the master cylinder 2 is a hydraulic pressure resulting from a subtraction of a hydraulic pressure corresponding to a brake force generated by the regenerative braking from a hydraulic pressure that will be required when the brake force is generated only by the hydraulic braking in response to driver's braking request. Therefore, when the brake force by the regenerative braking is provided as a hydraulic pressure or an amount proportional to a hydraulic pressure, it is possible to simplify the calculation and improve the control accuracy by controlling an operation of the electric motor 22 based on the target hydraulic pressure PT, compared to the control based on the target relative displacement ΔXT.

[Switch Based on Whether Vehicle is Currently Under Normal Brake Force Control]

The control switch unit 46C determines whether the vehicle is currently under a normal brake force control generating a brake force according to driver's operation amount Xop of the brake pedal 19. If the vehicle is currently under the normal brake force control, the control switch unit 46C performs the control with use of the target relative displacement ΔXT established by the relative displacement controller 46A. If the vehicle is not under the normal brake force control, the control switch unit 46C performs the control with use of the target hydraulic pressure PT established by the hydraulic pressure controller 46B. The term "normal brake force control" means a brake force control of transmitting a hydraulic pressure generated in the master cylinder 2 to the wheel cylinder without an addition or a reduction in response to driver's operation amount Xop of the brake pedal 19 (brake force request) (including a brake force distribution control), and free from an intervention of a control of the wheel pressure control mechanism 5 by the wheel pressure control unit 6 such as the anti-lock control, the traction control, and the vehicle stability control. On the other hand, a control that is not the normal brake force control means a control containing an intervention of a control of the wheel pressure control mechanism 5 by the wheel pressure control unit 6 based on a control input that is not the operation amount Xop of the brake pedal 19, for example, when an ABS, a traction control, or a vehicle stability control is in operation.

Figure 14:
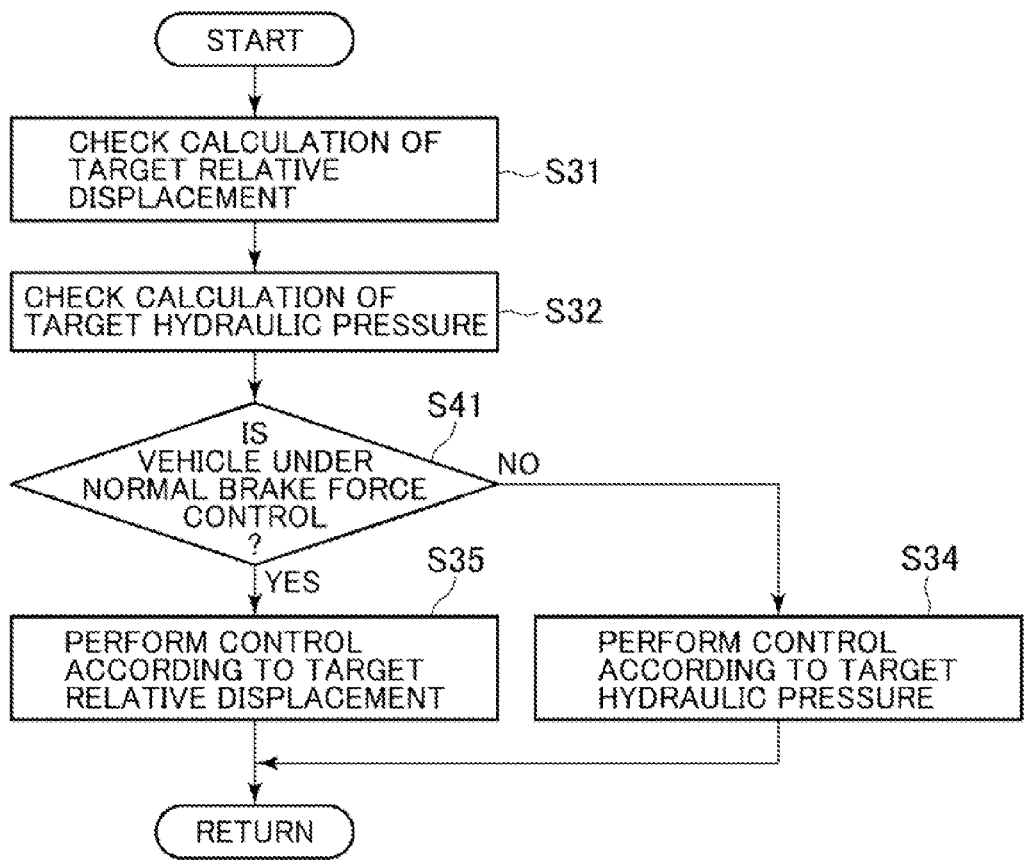
FIG. 14 is a flowchart illustrating a switch control based on whether a vehicle is currently under a normal brake force control.

FIG. 14 shows a flow of a switch control performed by the control switch unit 46C at this time. Referring to FIG. 14, in step S31, the control switch unit 46C checks the target relative displacement determined by the relative displacement controller 46A based on the operation amount Xop of the brake pedal 19. In step S32, the control switch unit 46C checks the target hydraulic pressure PT determined by the hydraulic pressure controller 46B. In step S41, the control switch unit 46C determines whether the vehicle is currently under the normal brake force control. If the control switch unit 46C determines that the vehicle is currently under the normal brake force control, the processing proceeds to step S35 in which the control switch unit 46C performs the control with use of the target relative displacement ΔXT. If the control switch unit 46C determines that the vehicle is not currently under the normal brake force control, the processing proceeds to step S34 in which the control switch unit 46C performs the control with use of the target hydraulic pressure PT. At this time, the master pressure control unit 4 inputs an operation signal from the control units mounted on the vehicle such as the anti-lock brake system and the vehicle stability control system through the CAN communication interface 53, and the control switch unit 46C determines whether the vehicle is currently under the normal brake force control based on the input operation signal.

Under the control with use of the target relative displacement ΔXT, the target relative displacement ΔXT is determined according to the operation amount Xop (displacement, pressing force) of the brake pedal 19, and therefore the position of the primary piston 8 is determined based on the operation amount Xop of the brake pedal 19. Therefore, in the normal brake force control, it is possible to reduce a change in the reactive force generated by the hydraulic pressure in the master cylinder 2 that is fed-back to the brake pedal 19 through the input piston 17, resulting in improvement in the feeling in an operation of the brake pedal 19.

On the other hand, under a control that is not the normal brake force control, an operation of the wheel hydraulic pressure control mechanism 5 may cause a change in the rigidity to the hydraulic pressure in the hydraulic circuit at the downstream side of the master cylinder 2 due to opens/closes of the supply valves 35A and 35B and the pressurization valves 41A and 41B, and starts/stops of the pumps 39A and 39B. Therefore, the control with use of the target relative displacement ΔXT may undermine the stability of position of the primary piston 8 due to the change in the rigidity in the hydraulic circuit, and thereby undermining the stability of the hydraulic pressure generated in the master cylinder 2. On the other hand, the control with use of the target hydraulic pressure PT may be able to maintain the stability of the hydraulic pressure generated in the master cylinder 2 since the hydraulic pressure in the master cylinder 2 is relatively less influenced by a change in the rigidity of the hydraulic circuit.

In this way, the brake force control is appropriately switched between the control with use of the target relative displacement ΔXT and the control with use of the target hydraulic pressure PT according to whether the vehicle is currently under the normal brake force control, as a result of which it is possible to provide a stabilized control while improving the feeling in an operation of the brake pedal 19.

[Switch Based on Whether Vehicle is Currently Under Control by Wheel Pressure Control Unit]

The control switch unit 46C determines whether the wheel pressure control unit 6 currently controls an operation of the wheel pressure control mechanism 5. If the wheel pressure control unit 6 does not currently control an operation of the wheel pressure control mechanism 5, the control switch unit 46C performs the control with use of the target relative displacement ΔXT established by the relative displacement controller 46A. If the wheel pressure controller 6 currently controls an operation of the wheel pressure control mechanism 5 to perform, for example, the anti-lock control, the traction control, or the vehicle stability control to control a hydraulic pressure to each wheel cylinder, the control switch unit 46C performs the control with use of the target hydraulic pressure PT established by the hydraulic pressure controller 46B.

Figure 15:
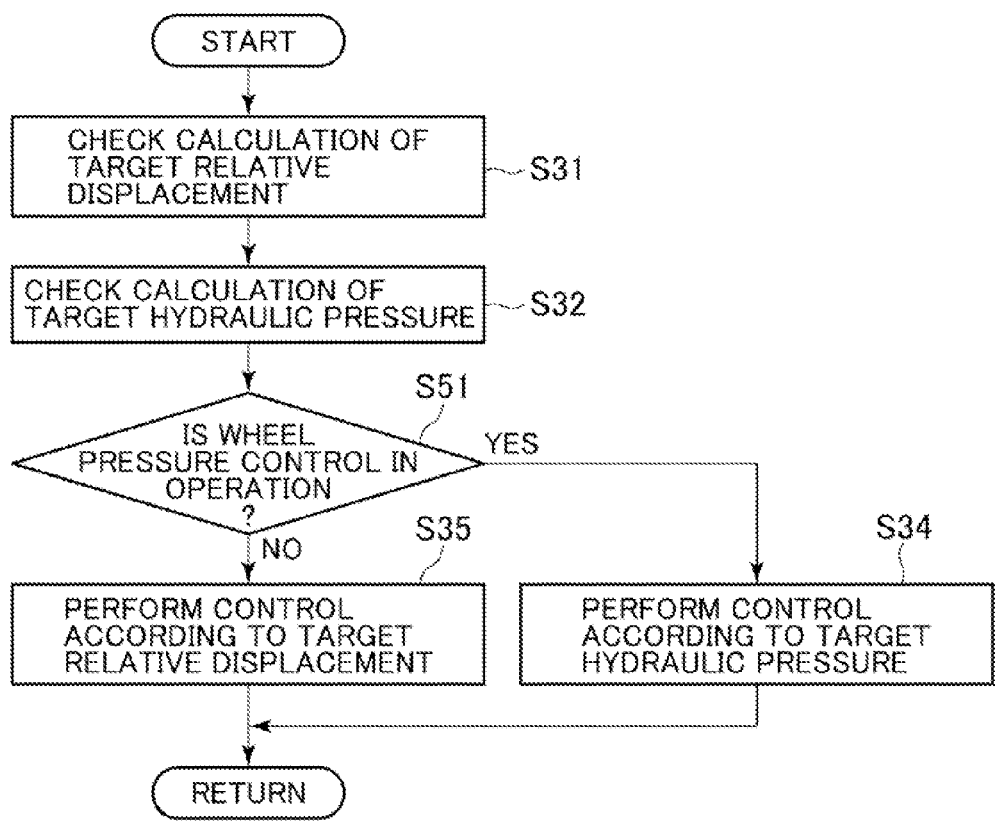
FIG. 15 is a flowchart illustrating a switch control based on whether a wheel pressure control is in operation.

FIG. 15 shows a flow of a switch control performed by the control switch unit 46C at this time. Referring to FIG. 15, in step S31, the control switch unit 46C checks the target relative displacement determined by the relative displacement controller 46A ΔXT based on the operation amount Xop of the brake pedal 19. In step S32, the control switch unit 46C checks t the target hydraulic pressure PT determined by the hydraulic pressure controller 46B. In step S51, the control switch unit 46C determines whether the wheel hydraulic pressure controller 6 currently controls the wheel pressure control mechanism 5. If the control switch unit 46C determines that the wheel hydraulic pressure controller 6 does not currently control the wheel pressure control mechanism 5, the processing proceeds to step S35 in which the control switch unit 46C performs the control with use of the target relative displacement ΔXT established by the relative displacement controller 46A. If the control switch unit 46C determines that the wheel hydraulic pressure controller 6 currently controls the wheel pressure control mechanism 5, the processing proceeds to step S34 in which the control switch unit 46C performs the control with use of the target hydraulic pressure PT established by the hydraulic pressure controller 46B. At this time, the master pressure control unit 4 inputs an operation signal from the control units mounted on the vehicle such as the regenerative braking system R, the anti-lock brake system, the vehicle stability control system, and the brake force distribution control system through the CAN communication interface 53, and the control switch unit 46C determines whether the wheel pressure control unit 6 currently controls the wheel pressure control mechanism 5.

An operation of the wheel hydraulic pressure control mechanism 5 may causes a change in the rigidity to the hydraulic pressure in the hydraulic circuit at the downstream side of the master cylinder 2 due to opens/closes of the supply valves 35A and 35B and the pressurization valves 41A and 41B, and starts/stops of the pumps 39A and 39B. Therefore, the control with use of the target relative displacement ΔXT may undermine the stability of position of the primary piston 8 due to the change in the rigidity in the hydraulic circuit, and thereby undermining the stability of the hydraulic pressure generated in the master cylinder 2. On the other hand, the control with use of the target hydraulic pressure PT may be able to maintain the stability of the hydraulic pressure generated in the master cylinder 2 since the hydraulic pressure in the master cylinder 2 is relatively less influenced by a change in the rigidity of the hydraulic circuit.

[Switch Based on Whether Hill Start Aid Control is in Operation]

The control switch unit 46C determines whether the hill start aid control is in operation. If the hill start aid control (hereinafter referred to as "HSA") is not in operation, the control switch unit 46C performs the control with use of the target relative displacement ΔXT established by the relative displacement controller 46A. If the HSA is in operation, the control switch unit 46C performs the control with use of the target hydraulic pressure PT established by the hydraulic pressure controller 46B.

Figure 16:
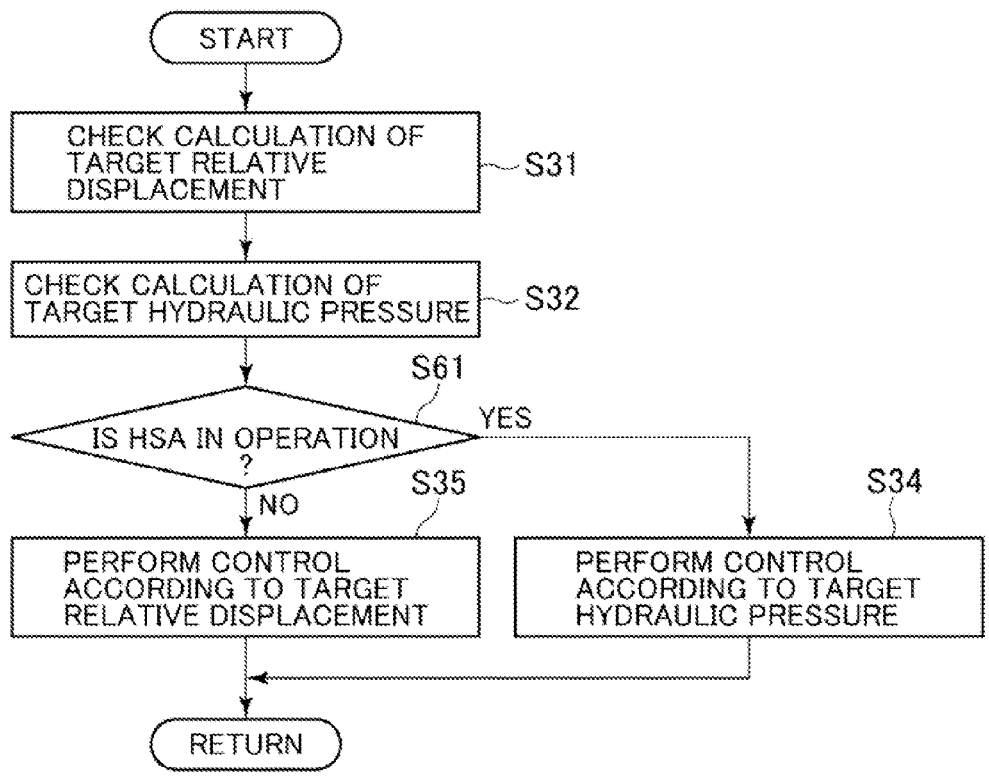
FIG. 16 is a flowchart illustrating a switch control based on whether an HSA is in operation.

FIG. 16 shows a flow of a switch control performed by the control switch unit 46C at this time. Referring to FIG. 16, in step S31, the control switch unit 46C checks the target relative displacement determined by the relative displacement controller 46A based on the operation amount Xop of the brake pedal 19. In step S32, the control switch unit 46C checks the target hydraulic pressure PT determined by the hydraulic pressure controller 46B. In step S61, the control switch unit 46C determines whether the HSA is in operation. If the control switch unit 46C determines that the HSA is not in operation, the processing proceeds to step S35 in which the control switch unit 46C performs the control with use of the target relative displacement $\Delta XT$. If the control switch unit 46C determines that the HSA is in operation, the processing proceeds to step S34 in which the control switch unit 46C performs the control with use of the target hydraulic pressure PT. The control switch unit 46C determines whether the HSA is in operation based on operation information of the HSA input through the CAN communication interface 53.

When the HSA is in operation, the brake apparatus 1 performs a control of temporarily keeping the hydraulic pressure in the master cylinder 2 or the wheel cylinder when a driver releases the brake pedal 19, and releasing the hydraulic pressure when the vehicle starts to run. At this time, execution of the control with use of the target hydraulic pressure PT enables accurate adjustment to a required hydraulic pressure.

The control with use of the target hydraulic pressure PT may be performed when the brake apparatus 1 keeps the hydraulic pressure, and the control with use of the target relative displacement $\Delta XT$ may be performed when the brake apparatus 1 releases the hydraulic pressure. As a result, it is possible to more smoothly release the hydraulic pressure. Further, the operation mode of the HSA may be divided into processes, and the control may be appropriately switched between the control with use of the target relative displacement $\Delta XT$ and the control with use of the target hydraulic pressure PT according to the processes.

[Switch Based on Whether Vehicle is Stopped]

The control switch unit 46C determines whether the vehicle is stopped. If the vehicle is not stopped (if the vehicle is running), the control switch unit 46C performs the control with use of the target relative displacement $\Delta XT$ established by the relative displacement controller 46A. If the vehicle is stopped, the control switch unit 46C performs the control with use of the target hydraulic pressure PT established by the hydraulic pressure controller 46B.

Figure 17:
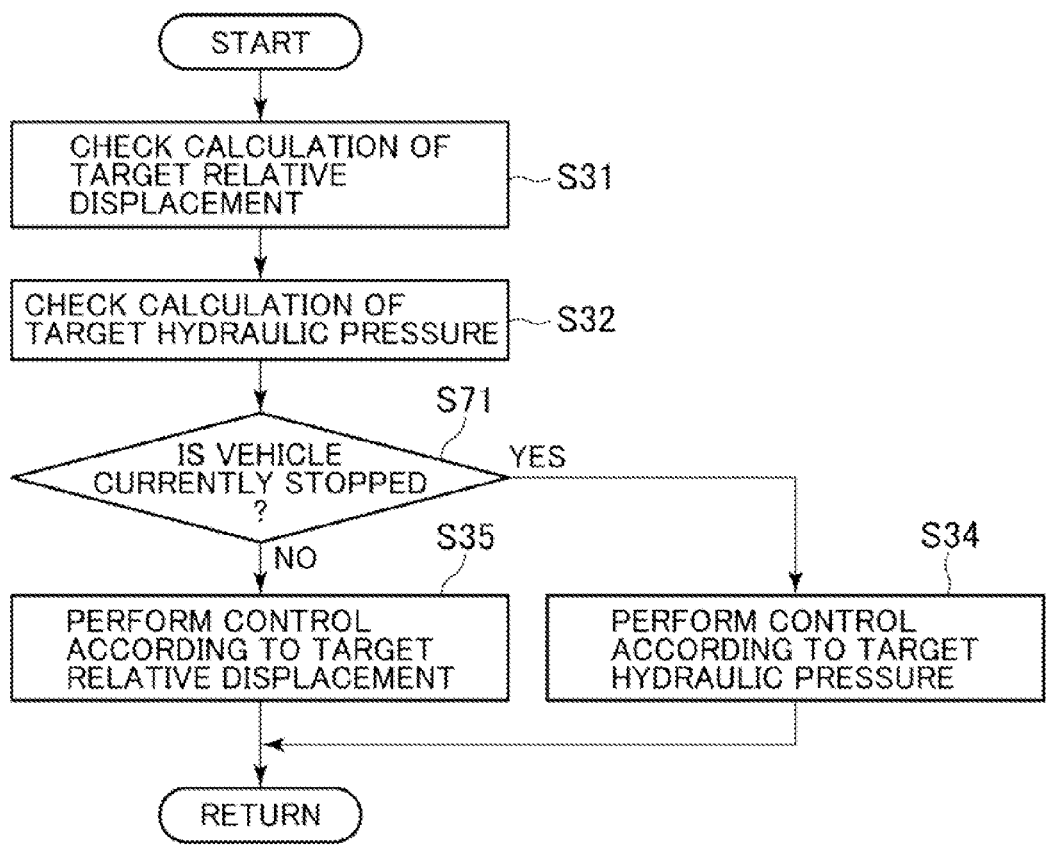
FIG. 17 is a flowchart illustrating a switch control based on whether the vehicle is stopped.

FIG. 17 shows a flow of a switch control performed by the control switch unit 46C at this time. Referring to FIG. 17, in step S31, the control switch unit 46C checks the target relative displacement determined by the relative displacement controller 46A based on the operation amount Xop of the brake pedal 19. In step S32, the control switch unit 46C checks the target hydraulic pressure PT determined by the hydraulic pressure controller 46B. In step S71, the control switch unit 46C determines whether the vehicle is stopped. If the control switch unit 46C determines that the vehicle is not stopped, the processing proceeds to step S35 in which the control switch unit 46C performs the control with use of the target relative displacement $\Delta XT$ established by the relative displacement controller 46A. If the control switch unit 46C determines that the vehicle is stopped, the processing proceeds to step S34 in which control switch unit 46C performs the control with use of the target hydraulic pressure PT established by the hydraulic pressure controller 46B. The control switch unit 46C determines whether the vehicle is stopped based on a vehicle speed signal from, for example, a vehicle speed sensor, or vehicle speed information input from, for example, another vehicle-mounted device connected to the wheel pressure control unit 6 or the CAN through the CAN communication interface 53.

As a result, it is possible to reduce power consumed by the electric motor 22 by performing the control with use of the target hydraulic pressure PT when the vehicle is stopped so as to adjust the hydraulic pressure to a minimum level enabling the stopped state to be maintained. Preferably, the minimum hydraulic pressure at this time is set as a hydraulic pressure under imaginable most strict conditions about, for example, the condition of the inclination degree of a road. Further, since a hydraulic pressure is generated by the input piston 17 when a driver strongly presses down the brake pedal 19 while the vehicle is stopped, it is possible to reduce the thrust force of the primary piston 8 to be generated by the electric motor 22 by an amount corresponding to the hydraulic pressure generated by the input piston 17, thereby reducing the electric consumption.

Power consumed by the electric motor 22 can be also reduced by execution of the control with use of the target relative displacement $\Delta XT$ when the vehicle is stopped, and presetting of the target relative displacement $\Delta XT$ that is a minimum hydraulic pressure enabling a stopped state to be maintained. In this case, it is possible to increase a brake force since the hydraulic pressure is increased by an advance of the input piston 17 when a driver presses the brake pedal 19.

[Combination of the Above-Mentioned Switch Controls]

The control switch unit 46C can also appropriately switch between the control with use of the target relative displacement $\Delta XT$ calculated by the relative displacement controller 46A and the control with use of the target hydraulic pressure PT calculated by the hydraulic pressure controller 46B, by combining the above-mentioned switch controls and determining whether the regenerative braking system is in operation, the vehicle is currently under the normal brake force control, the wheel pressure control unit is in operation for the hydraulic pressure control, the HSA is in operation, and the vehicle is stopped.

Figure 18:
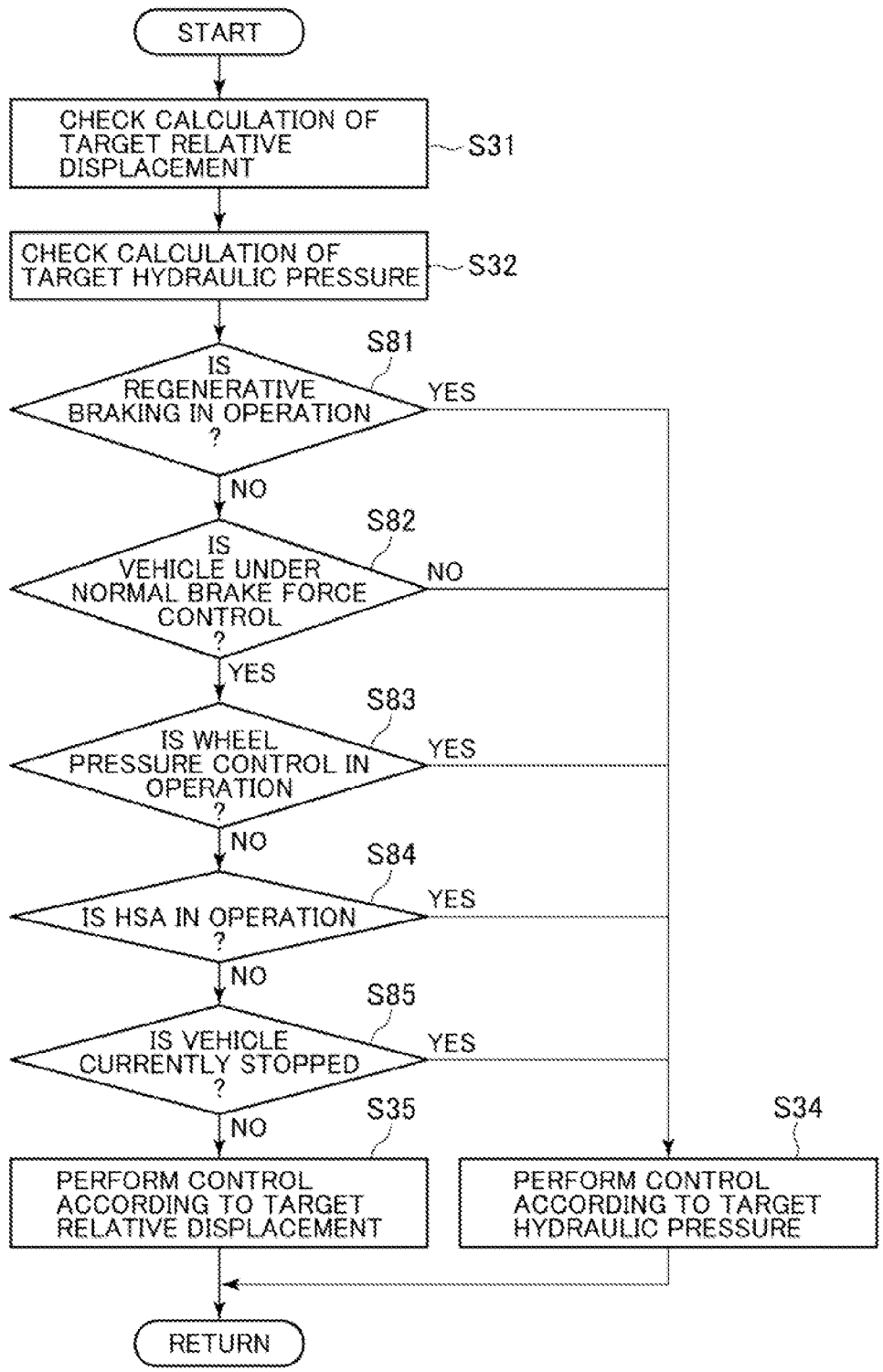
FIG. 18 is a flowchart illustrating a control from a combination of the switch controls shown in FIGS. 13 to 17.

FIG. 18 shows a flow of a switch control performed by the control switch unit 46C at this time. Referring to FIG. 18, in step S31, the control switch unit 46C checks the target relative displacement determined by the relative displacement controller 46A based on the operation amount Xop of the brake pedal 19. In step S2, the control switch unit 46C checks the target hydraulic pressure PT determined by the hydraulic pressure controller 46B. In step S81, the control switch unit 46C determines whether the regenerative braking system R is currently in operation for regenerative braking. If the regenerative braking system R is currently in operation for regenerative braking, the processing proceeds to step S34 in which the control switch unit 46C performs the control with use of the target hydraulic pressure PT. If the regenerative braking system R is not in operation for regenerative braking, the processing proceeds to step S82. In step S82, the control switch unit 46C determines whether the vehicle is currently under the normal brake force control. If the control switch unit 46C determines that the vehicle is not currently under the normal brake force control, the processing proceeds to step S34 in which the control switch unit 46C performs the control with use of the target hydraulic pressure PT. If the control switch unit 46C determines that the vehicle is currently under the normal brake force control, the processing proceeds to step S83. In step S83, the control switch unit 46C determines whether the wheel hydraulic pressure control unit 6 currently controls the wheel hydraulic pressure control mechanism 5. If control switch unit 46C determines that the wheel hydraulic pressure control unit 6 currently controls the wheel hydraulic pressure control mechanism 5, the processing proceeds to step S34 in which the control switch unit 46C performs the control with use of the target hydraulic pressure PT. If the control switch unit 46C determines that the wheel hydraulic pressure control unit 6 does not currently control the wheel hydraulic pressure control mechanism 5, the processing proceeds to step S84. In step S84, the control switch unit 46C determines whether the HSA is currently in operation. If the control switch unit 46C determines that the HSA is currently in operation, the processing proceeds to step S34 in which the control switch unit 46C performs the control with use of the target hydraulic pressure PT. If the control switch unit 46C determines that the HSA is not currently in operation, the processing proceeds to step S85. In step S85, the control switch unit 46C determines whether the vehicle is currently stopped. If the control switch unit 46C determines that the vehicle is currently stopped, the processing proceeds to step S34 in which the control switch unit 46C performs the control with use of the target hydraulic pressure PT. If the control switch unit 46C determines that the vehicle is not currently stopped, the processing proceeds to step S35 in which the control switch unit 46C performs the control with use of the target relative displacement ΔXT established by the relative displacement controller 46A.

In this way, the present embodiment is even capable of a control in which the above-mentioned switch controls are combined. Steps S81 to 85 in the control flow shown in FIG. 18 may be performed in a different arbitrary order, and some of them may be omitted by arbitrarily selecting only required determinations The above-mentioned embodiment has been described based on an example of switching between the control with use of the target relative displacement ΔXT and the control with use of the target hydraulic pressure PT according to predetermined conditions. The conditions for switching between these controls may be set according to characteristics of an individual system, and switching to which control may be set arbitrarily.

In the above-mentioned embodiment, the brake operation amount detector 34 detecting the operation amount Xop of the brake pedal 19 is embodied by the stroke detector for detecting a stroke of the brake pedal 19. However, the present invention is not limited thereto. The brake operation amount detector 34 may be embodied by a pressing force estimator determining the estimated pressing force based on the relative displacement between the piston 8 and the input member 17 and the brake hydraulic pressure in the master cylinder 2 detected by the hydraulic pressure sensor 45A. In this case, the estimated pressing force is used as the operation amount of the brake pedal 19. Further, the brake apparatus 1 may be equipped with both the stroke detector and the pressing force estimator, and use either the stroke of the brake pedal or the estimated pressing force as the operation amount of the brake pedal.

Further, the brake apparatus 1 may be configured in such a manner that, with respect to the target relative displacement set to the same operation amount Xop of the brake pedal, the target relative displacement when the brake pedal is released (L3 in FIG. 5) is larger than the relative displacement when the brake pedal is pressed (L1 in FIG. 5). Setting a hysteresis in the counterclockwise direction in this way can realize brake feeling similar to a generally-used negative pressure booster. In this case, the target relative displacement may be set in such a manner that the position of the piston is temporarily maintained when the brake pedal is pressed and then released (L2 in FIG. 5). As a result, it is possible to prevent an excessive change in the hydraulic pressure due to a movement of the piston.

Similarly, in the above-mentioned embodiment, the brake apparatus 1 may be configured in such a manner that, with respect to the target hydraulic pressure set to the same operation amount Xop of the brake pedal, the target hydraulic pressure when the brake pedal is released (L3 in FIG. 7) is larger than the target hydraulic pressure when the brake pedal is pressed (L1 in FIG. 7). Setting a hysteresis in the counterclockwise direction in this way can realize brake feeling similar to a generally-used negative pressure booster (for example, a so-called "hanging-on" which means prevention of a reduction in brake force when a driver releases a brake pedal). In this case, the target hydraulic pressure may be set in such a manner that the brake hydraulic pressure in the master cylinder is temporarily maintained when the brake pedal is pressed and then released (L2 in FIG. 7). As a result, it is possible to prevent an excessive change in the hydraulic pressure due to a movement of the piston.

Further, the above-mentioned target relative displacement and target hydraulic pressure may be set so as to be within predetermined ranges according to the operation amount Xop of the brake pedal. Those predetermined ranges are determined based on limitations derived from the structure of the master pressure control mechanism and limitations derived from the control for, for example, operation feeling of the brake pedal.

Further, the target hydraulic pressure may be set in such a manner that the brake hydraulic pressure in the master cylinder is changed at a constant rate in response to the operation amount Xop when a driver presses the brake pedal.

Further, the above-mentioned switch unit may be configured so as to control an operation of the actuator based on the hydraulic pressure controller during execution of the hill start aid control.

Further, the above-mentioned switch unit may be configured so as to control an operation of the actuator based on the relative displacement controller when the vehicle is stopped.

Further, the above-mentioned switch unit may be configured so as to control an operation of the actuator based on the hydraulic pressure controller during execution of a braking control that is not actuated by an operation of the brake pedal (for example, the vehicle stability control or the hill start aid control).

Further, the switch unit may be configured so as to control an operation of the actuator based on the hydraulic pressure controller controls during execution of a control causing a change in the brake hydraulic pressure in the master cylinder with respect to the certain operation amount Xop of the brake pedal (for example, the anti-lock brake control).

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-084207, filed on Mar. 31, 2010. The entire disclosure of Japanese Patent Application No. 2010-084207, filed on Mar. 31, 2010 including specification, claims, drawings and summary is incorporated herein by reference in its entirety.

What is claimed is:

1. A brake control system comprising:
an input member configured to move forward or backward according to an operation of a brake pedal;
a piston disposed so as to be movable relative to the input member;
an actuator configured to cause a forward or backward movement of the piston; and
a control unit configured to drive the actuator to operate according to a movement of the input member by the brake pedal to generate a thrust force to the piston to generate a brake fluid pressure in a master cylinder,
the control unit comprising
a relative displacement controller configured to set a target relative displacement with respect to a relative displacement between the input member and the piston based on an operation amount of the brake pedal, and control an operation of the actuator so that the relative displacement between the input member and the piston reaches the target relative displacement;
a fluid pressure controller configured to set a target fluid pressure with respect to the brake fluid pressure in the master cylinder based on the operation amount of the brake pedal, and control the operation of the actuator so that the brake fluid pressure in the master cylinder reaches the target fluid pressure; and
a control switch unit configured to switch which is used to control the operation of the actuator, the relative displacement controller or the fluid pressure controller.

2. The brake control system according to claim 1, wherein the control switch unit controls the operation of the actuator with use of the fluid pressure controller during a regenerative control.

3. The brake control system according to claim 1, wherein the control switch unit controls the operation of the actuator with use of the relative displacement controller during a normal control in which the fluid pressure in the master cylinder is directly distributed into a wheel cylinder, and controls the operation of the actuator with use of the fluid pressure controller during a wheel pressure control in which the fluid pressure in the wheel cylinder is adjusted relative to the brake fluid pressure in the master cylinder.

4. The brake control system according to claim 1, wherein the control switch unit controls the operation of the actuator so as to generate a minimum fluid pressure enabling a stopped state to be maintained with use of the fluid pressure controller or the relative displacement controller when the vehicle is stopped.

5. The brake control system according to claim 1, wherein the target relative displacement or target fluid pressure set in response to a certain operation amount of the brake pedal when the brake pedal is released is larger than the target relative displacement or target fluid pressure set in response to the certain operation amount of the brake pedal when the brake pedal is pressed.

6. The brake control system according to claim 5, wherein the target relative displacement is set so that a position of the piston is temporarily maintained when the brake pedal is released after being pressed.

7. The brake control system according to claim 5, wherein the target fluid pressure is set so that the brake fluid pressure in the master cylinder is temporarily maintained when the brake pedal is released after being pressed.

8. A brake control system comprising:
an actuator configured to cause a forward or backward movement of a piston disposed so as to be movable relative to an input member configured to move forward or backward according an operation of a brake pedal to generate a brake fluid pressure in a master cylinder; and
a control unit configured to drive the actuator to operate according to a movement of the input member by the brake pedal,
the control unit comprising
a relative displacement controller configured to set a target relative displacement with respect to a relative displacement between the input member and the piston based on an operation amount of the brake pedal, and control an operation of the actuator so that the relative displacement between the input member and the piston reaches the target relative displacement;
a fluid pressure controller configured to set a target fluid pressure with respect to the brake fluid pressure in the master cylinder based on the operation amount of the brake pedal, and control the operation of the actuator so that the brake fluid pressure in the master cylinder reaches the target fluid pressure; and
a control switch unit configured to switch from a control with use of the relative displacement controller to a control with use of the fluid pressure controller according to a switch instruction.

9. The brake control system according to claim 8, wherein the control switch unit controls the operation of the actuator with use of the fluid pressure controller during a regenerative control.

10. The brake control system according to claim 8, wherein the control switch unit controls the operation of the actuator with use of the relative displacement controller during a normal control in which the fluid pressure in the master cylinder is directly distributed into a wheel cylinder, and controls the operation of the actuator with use of the fluid pressure controller during a wheel pressure control in which the fluid pressure in the wheel cylinder is adjusted relative to the brake fluid pressure in the master cylinder.

11. The brake control system according to claim 8, wherein the control switch unit controls the operation of the actuator so as to generate a minimum fluid pressure enabling a stopped state to be maintained with use of the fluid pressure controller or the relative displacement controller when the vehicle is stopped.

12. The brake control system according to claim 8, wherein the target relative displacement or target fluid pressure set in response to a certain operation amount of the brake pedal when the brake pedal is released is larger than the target relative displacement or target fluid pressure set in response to the certain operation amount of the brake pedal when the brake pedal is pressed.

13. The brake control system according to claim 12, wherein the target relative displacement is set so that a position of the piston is temporarily maintained when the brake pedal is released after being pressed.

14. The brake control system according to claim 12, wherein the target fluid pressure is set so that the brake fluid pressure in the master cylinder is temporarily maintained when the brake pedal is released after being pressed.

15. A brake control system comprising:
a control unit configured to drive an actuator to operate to move a piston forward or backward to generate a brake fluid pressure in a master cylinder according to a movement of an input member caused by an operation of a brake pedal,
the control unit comprising
a relative displacement controller configured to set a target relative displacement with respect to a relative displacement between the input member and the piston based on an operation amount of the brake pedal, and control an operation of the actuator so that the relative displacement between the input member and the piston reaches the target relative displacement;

a fluid pressure controller configured to set a target fluid pressure with respect to the brake fluid pressure in the master cylinder based on the operation amount of the brake pedal, and control the operation of the actuator so that the brake fluid pressure in the master cylinder reaches the target fluid pressure; and a control switch unit configured to switch from a control with use of the relative displacement controller to a control with use of the fluid pressure controller, when the brake control system is under a control causing a change in the target fluid pressure during a brake operation.

16. The brake control system according to claim 15, wherein the control switch unit controls the operation of the actuator with use of the fluid pressure controller during a regenerative control.

17. The brake control system according to claim 15, wherein the control switch unit controls the operation of the actuator so as to generate a minimum fluid pressure enabling a stopped state to be maintained with use of the fluid pressure controller or the relative displacement controller when the vehicle is stopped.

18. The brake control system according to claim 15, wherein the target relative displacement or target fluid pressure set in response to a certain operation amount of the brake pedal when the brake pedal is released is larger than the target relative displacement or target fluid pressure set in response to the certain operation amount of the brake pedal when the brake pedal is pressed.

19. The brake control system according to claim 18, wherein the target relative displacement is set so that a position of the piston is temporarily maintained when the brake pedal is released after being pressed.

20. The brake control system according to claim 18, wherein the target fluid pressure is set so that the brake fluid pressure in the master cylinder is temporarily maintained when the brake pedal is released after being pressed.

\* \* \* \* \*